US012621697B2

(12) United States Patent
Wang et al.

(10) Patent No.: US 12,621,697 B2
(45) Date of Patent: May 5, 2026

(54) COMMUNICATION METHOD AND APPARATUS TO OPTIMIZE A MEASUREMENT POLICY

(71) Applicant: HUAWEI TECHNOLOGIES CO., LTD., Shenzhen (CN)

(72) Inventors: Miao Wang, Shenzhen (CN); Xi Xie, Beijing (CN); Junren Chang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 853 days.

(21) Appl. No.: 17/966,498

(22) Filed: Oct. 14, 2022

(65) Prior Publication Data

US 2023/0034121 A1 Feb. 2, 2023

Related U.S. Application Data

(63) Continuation of application No. PCT/CN2021/086833, filed on Apr. 13, 2021.

(30) Foreign Application Priority Data

Apr. 17, 2020 (CN) .......................... 202010304349.X

(51) Int. Cl.
  *H04W 24/10* (2009.01)
  *H04W 24/08* (2009.01)
(52) U.S. Cl.
  CPC ........... *H04W 24/10* (2013.01); *H04W 24/08* (2013.01)
(58) Field of Classification Search
  CPC ............................... H04W 24/10; H04W 24/08
  See application file for complete search history.

(56) References Cited

U.S. PATENT DOCUMENTS

2009/0247150 A1 10/2009 Fischer et al.
2014/0357197 A1* 12/2014 Jung ..................... H04W 24/10
  455/67.11

FOREIGN PATENT DOCUMENTS

CN 101790188 A 7/2010
EP 2584819 A1 4/2013
EP 2958362 A1 12/2015
WO WO-2011065874 A1 * 6/2011 .......... H04W 36/249
  (Continued)

OTHER PUBLICATIONS

R2-131161, Kyocera, Necessity for dual connectivity in the non-co-channel scenario, 3GPP TSG-RAN WG2 #81bis, Chicago, USA, Apr. 15-19, 2013, 3 pages.

(Continued)

*Primary Examiner* — Samina F Choudhry
(74) *Attorney, Agent, or Firm* — WOMBLE BOND DICKINSON (US) LLP

(57) ABSTRACT

A communication method and apparatus to optimize a measurement policy are described. The apparatus may receive a measurement configuration sent by a network device. The measurement configuration may include a first identity and a first period of the first identity. The apparatus sends a measurement report to the network device when the first period expires. The measurement report may include the first identity and a measurement result of the first identity. The measurement result of the first identity includes a measurement result of at least one second identity.

20 Claims, 8 Drawing Sheets

100

106

102 104

(56)     References Cited

FOREIGN PATENT DOCUMENTS

WO     2016179144  A1    11/2016
WO     2018174804  A1     9/2018

OTHER PUBLICATIONS

R4-124793, Huawei et al, Meeting minutes for eICIC and FeICIC ad hoc on Wednesday evening, 3GPP TSG-RAN WG4 Meeting #64, Qingdao, P.R. China, Aug. 13-17, 2012, 19 pages.
R2-167836, ZTE, ZTE Microelectronics, Consideration on the RRM Measurement for NR, 3GPP TSG-RAN WG2 Meeting #96, Reno, USA, Nov. 14-18, 2016, 6 pages.

* cited by examiner

100

106

102                                                  104

Communication apparatus 900

Communication apparatus 1000

COMMUNICATION METHOD AND APPARATUS TO OPTIMIZE A MEASUREMENT POLICY

CROSS-REFERENCE TO RELATED APPLICATIONS

This application is a continuation of International Application No. PCT/CN2021/086833, filed on Apr. 13, 2021, which claims priority to Chinese Patent Application No. 202010304349.X, filed on Apr. 17, 2020. The disclosures of the aforementioned applications are hereby incorporated by reference in their entireties.

TECHNICAL FIELD

This application relates to the wireless communications field, and more specifically, to a communication method and apparatus.

BACKGROUND

In a communication system, to perform radio resource management (RRM), a network device may configure and enable user equipment (UE) in a radio resource control (RRC) connected mode (RRC_CONNECTED) to perform measurement based on a measurement configuration and report a measurement result. The network device may perform a corresponding RRM policy based on a measurement report reported by the UE. For example, the network device may indicate, based on the measurement report reported by the UE, the UE to perform cell handover.

The measurement configuration sent by the network device includes a measurement identity, a measurement object, a report configuration, a measurement quantity configuration, a measurement gap, and the like. The measurement identity is used to associate the measurement object and the report configuration. The measurement object may be an object measured by the UE, for example, a frequency. The report configuration may include a trigger type for the UE to report the measurement result, for example, periodic reporting and event-triggered reporting. The periodic reporting may be, for example, that the network device or a protocol specifies that the UE reports the measurement result every specified period. The event-triggered reporting may be, for example, that the UE reports the measurement result to the network device when the measurement result obtained through measurement meets a trigger condition. The trigger condition may include an A-type event, for example, an A1 event, an A2 event, an A3 event, an A4 event, an A5 event, and an A6 event, and may further include a B-type event, for example, a B1 event and a B2 event. The type-A event is an intra-radio access technology (intra-RAT) event, and the type-B event is an inter-RAT event.

Currently, after obtaining the measurement result through measurement based on the measurement identity, the UE may report a measurement report corresponding to the measurement identity. The RRM policy performed by the network device depends on a sequence of measurement reports of the UE. As a result, the network device may make an inappropriate decision. For example, the network device configures measurement of the A3 event and measurement of the B2 event for the UE. After the UE performs measurement, a measurement result of the B2 event first meets the trigger condition, and the UE first reports a measurement report of the B2 event to the network device. After receiving the measurement result of the B2 event, the network device indicates the UE to perform inter-radio access technology handover (inter-RAT handover). The UE falls back to use a previous-generation wireless communications technology, for example, falls back from 5G to 4G, or falls back from 4G to 3G. However, the UE may report a measurement report of the A3 event shortly after reporting the measurement report of the B2 event. The measurement report of the A3 event indicates that the UE has an intra-RAT neighboring cell whose quality meets an access condition. Therefore, the network does not need to allow the UE to perform the inter-RAT handover.

Further, when reporting the measurement report to the network device, the UE currently may add a measurement result of a serving cell. When the serving cell of the UE does not change, each measurement report reported by the UE carries the measurement result of the serving cell, resulting in redundant reporting. In addition, if a plurality of measurement identities all meet the trigger condition, measurement reports of the plurality of measurement identities are simultaneously reported, easily resulting in a signaling storm.

SUMMARY

This application provides a communication method and apparatus, to optimize a measurement policy.

According to a first aspect, a communication method is provided. The method may be performed by a terminal device, for example, terminal devices such as a mobile phone, a tablet computer, or an in-vehicle terminal. The terminal device may receive a measurement configuration sent by a network device. The measurement configuration may include a first identity and a first period of the first identity. The first identity herein may be associated with one or more second identities. The second identity may be a measurement identity sent by the network device to the terminal device. The terminal device sends a measurement report to the network device when the first period expires. The measurement report may include the first identity and a measurement result of the first identity. The measurement result of the first identity includes a measurement result of at least one second identity.

In an embodiment, the network device may send the measurement configuration carrying the at least one second identity, the first identity, and the first period of the first identity to the terminal device. In this case, the terminal device may consider that the second identity included in the measurement configuration is a second identity associated with the first identity.

In another embodiment, the network device may send a plurality of second identities to the terminal device. Each second identity is associated with a measurement object and a report configuration. The network device further sends a measurement configuration to the terminal device, where the measurement configuration includes a first identity and a first period of the first identity. The measurement configuration does not indicate a second identity associated with the first identity. Therefore, it may be considered by default that the network device has associated the plurality of second identities of the terminal device with the first identity. The terminal device may perform, based on the second identity, measurement on the measurement object associated with the second identity, to obtain a measurement result of the second identity. When the first period expires, the terminal device sends a measurement report carrying measurement results of the plurality of second identities to the network device.

In addition, it should be noted that the report configuration associated with the second identity includes a reporting criterion. The measurement result of the second identity in the measurement report is a measurement result that meets the reporting criterion and that is of the second identity. For example, a reporting criterion in a report configuration associated with a second identity A is an A3 event, and a measurement result of the second identity A does not meet the A3 event. A reporting criterion in a report configuration associated with a second identity B is an A1 event, and a measurement result of the second identity B meets the A1 event. Since the measurement result of the second identity A does not meet the reporting criterion, and the measurement result of the second identity B meets the reporting criterion, a measurement report may include the measurement result of the second identity B.

According to this solution, the terminal device may uniformly report, to the network device, a measurement report carrying a measurement result of at least one second identity based on the configuration of the network device, so that signaling overheads can be reduced. In addition, the network device may also make a decision based on the measurement report that is of the terminal device and that includes the measurement result of the at least one second identity, so that the decision made by the network device can also be more appropriate.

In a possible embodiment, the measurement result of the at least one second identity is obtained through measurement within the first period.

According to this solution, the terminal device may perform measurement within the first period based on the at least one second identity, to obtain a measurement result, and add the measurement result to the measurement report. This not only can reduce signaling overheads, but also can enable the network device to make a more appropriate decision.

In a possible embodiment, the terminal device receives at least one second identity associated with the first identity, where the measurement result of the first identity includes a measurement result of the at least one second identity associated with the first identity. For example, if the measurement configuration received by the terminal device includes the first identity, the first period of the first identity, and a second identity list, a second identity in the second identity list is associated with the first identity. Alternatively, if the measurement configuration received by the terminal device includes the first identity and the first period of the first identity, and the terminal device further receives the first identity and the second identity list, the second identity in the second identity list is associated with the first identity.

According to this solution, the terminal device may perform measurement on the measurement object based on the second identity that is associated with the first identity and that is indicated by the network device, to obtain the measurement result. The measurement report sent by the terminal device may alternatively be a measurement result, of a second identity, concerned by the network device.

In a possible embodiment, the first identity is associated with a first threshold, and when a measurement result of a serving cell or a primary cell of the terminal device is less than the first threshold, the terminal device sends the measurement report of the first identity.

According to this solution, when the measurement result of the serving cell or the primary cell of the terminal device is lower than the first threshold, the serving cell or the primary cell cannot provide a good communication service for the terminal device. In this case, the terminal device may need to perform cell handover, and therefore may send the measurement report of the first identity to the network device, so that the network device makes a decision based on the measurement report, and does not need to wait to report the measurement report until the first period expires.

In a possible embodiment, the report configuration associated with the at least one second identity further includes a total quantity of reporting times. After the terminal device sends the measurement report of the first identity to the network device, the terminal device may increase a quantity of reporting times of the at least one second identity included in the measurement report of the first identity by a specified value. For example, when the measurement result of the serving cell or the primary serving cell of the terminal device is less than the first threshold, after sending the measurement report of the first identity, the terminal device may increase the quantity of reporting times of the second identity in the measurement report of the first identity by a specified value. In this case, when the first period expires, the measurement report sent by the terminal device may include a measurement result of a second identity whose quantity of reporting times is less than or equal to the total quantity of reporting times.

For another example, when the first period expires, after sending the measurement report of the first identity, the terminal device may increase the quantity of reporting times of the second identity included in the measurement report by a specified value. In this case, when the first period expires again, the measurement report sent by the terminal device may include a measurement result of a second identity whose quantity of reporting times is less than or equal to the total quantity of reporting times.

According to this solution, since the second identity is associated with the total quantity of reporting times, when sending the measurement report, the terminal device may send, based on the quantity of reporting times of the second identity and the total quantity of reporting times, a measurement report carrying the measurement result of the second identity to the network device.

In a possible embodiment, the measurement report further includes a measurement result of a serving cell of the terminal device.

In a current measurement report, a measurement identity of each second identity includes the measurement result of the serving cell of the terminal device, resulting in some redundant reporting. According to this solution, the measurement report of the first identity carries the measurement result of the serving cell of the terminal device, so that transmitted data can be reduced, and redundant reporting can be avoided.

In a possible embodiment, the method further includes: The terminal device starts a first timer, where duration of the first timer is the first period; and that the terminal device sends a measurement report when the first period expires includes: When the first timer times out, the terminal device sends the measurement report of the first identity, and restarts the first timer. The first timer herein may be carried in the measurement configuration and sent to the terminal device. In other words, the first period may be implemented by using the first timer.

According to this solution, the first period may be implemented by using the first timer. When the first timer times out, the terminal device may send the measurement report of the first identity to the network device.

In a possible embodiment, if the measurement configuration further includes first indication information, or if the terminal device receives the first indication information, the terminal device sends the measurement report of the first identity. For example, after sending the measurement configuration to the terminal device, the network device further sends a first indication to the terminal device. In this case, when receiving the first indication, the terminal device may send the measurement report of the first identity to the network device.

According to this solution, the terminal device may send the measurement report of the first identity to the network device based on the first indication information, and does not need to send the measurement report to the network device until the first period expires.

In a possible embodiment, the report configuration associated with the second identity may include an indication for reporting a strongest neighboring cell of the terminal device. If a second identity associated with the indication for reporting the strongest neighboring cell of the terminal device exists in the at least one second identity, the measurement report further includes a measurement result of the strongest neighboring cell of the serving cell of the terminal device. The report configuration associated with the second identity may further include an indication for reporting a specified measurement quantity type. If a second identity associated with the indication for reporting the specified measurement quantity type exists in the at least one second identity, the measurement report further includes a measurement result of the specified measurement quantity type of a serving cell of the terminal device.

For example, the specified measurement quantity type may be reference signal received power (RSRP), reference signal received quality (RSRQ), or a signal to interference plus noise ratio (SINR).

According to this solution, the terminal device may perform measurement on a neighboring cell of the terminal device according to the indication of the network device, and the terminal device may further obtain a specified measurement quantity type of the measurement object according to the indication of the network device.

In a possible embodiment, the report configuration of the second identity further includes a first value. The first value herein is only a maximum quantity of beams reported by the terminal device. If a second identity associated with the first value exists in the at least one second identity, the measurement report further includes a measurement result of a beam, of the serving cell, whose quantity does not exceed a second value. The second value herein may be determined based on the first value.

For example, the second value is a maximum value in a plurality of first values; or the second value is a minimum value in the plurality of first values; or if only one second identity in the at least one second identity is associated with the first value, the second value is the same as the first value.

According to this solution, the terminal device may send measurement results of a specific quantity of beams of the serving cell to the network device according to the indication of the network device.

In a possible embodiment, when determining that the terminal device enters a medium-speed or high-speed state, the terminal device determines a scale factor, where the scale factor is used to scale the first period. The medium-speed or high-speed state herein may mean that the terminal device frequently performs cell handover within a specific time.

According to this solution, when the terminal device enters the medium-speed or high-speed state, the terminal device may scale the first period based on the scale factor, and send the measurement report of the first identity based on the scaled first period.

In a possible embodiment, when the terminal device fails to send the measurement report of the first identity and at least one second identity in the at least one second identity is associated with a second timer, the second timer is started. When the second timer times out, the terminal device performs an operation corresponding to the second timer.

According to this solution, when the terminal device fails to send the measurement report, the network device cannot make a decision based on the measurement report. Therefore, the terminal device may perform a corresponding operation based on the report configuration used when the network device indicates the second identity.

According to a second aspect, an embodiment of this application further provides another communication method. The communication method may be performed by a network device. The network device receives a measurement report sent by a terminal device, where the measurement report includes a first identity and a measurement result of the first identity, and the measurement result of the first identity includes a measurement result of at least one second identity. The network device may process the measurement report. For example, the network device may determine, based on the measurement report, that the terminal device performs inter-RAT handover, intra-RAT handover, or the like.

According to this solution, the network device may perform processing and make a decision based on the measurement report sent by the terminal device, so that the decision made by the network device can be more appropriate.

In a possible embodiment, the method further includes: The network device sends a measurement configuration to the terminal device. The measurement configuration may include a first identity and a first period of the first identity. For example, the measurement configuration may include one first identity and a first period of the first identity. Alternatively, the measurement configuration may include a plurality of first identities and a first period corresponding to each first identity. Alternatively, the measurement configuration may include a plurality of first identities and one first period, and it may be considered that the plurality of first identities have a same first period.

According to this solution, the network device may configure the first identity and the first period of the first identity for the terminal device based on the measurement configuration, so that the terminal device can send the measurement report of the first identity when the first period expires.

In a possible embodiment, the method further includes: The network device sends at least one second identity associated with the first identity to the terminal device, where the measurement result of the first identity includes a measurement result of the at least one second identity associated with the first identity. For example, the network device may send the first identity and a second identity list to the terminal device. In this case, it may be considered that a second identity in the second identity list is associated with the first identity. Alternatively, the network device may send one or more second identities to the terminal device, and the network device further sends the first identity and the first period of the first identity to the terminal device. In this case, it may also be considered that the one or more second identities that have been sent by the network device are associated with the first identity in the measurement configuration. Alternatively, the network device may add the first identity, the first period of the first identity, and the second identity list to the measurement configuration. In this case, it may be considered that a second identity in the second identity list is associated with the first identity.

In an embodiment, the measurement result of the at least one second identity is obtained through measurement within the first period. Alternatively, the measurement result of the at least one second identity may be obtained through measurement after the at least one second identity is received and before the first period expires.

According to this solution, the network device may send the at least one second identity associated with the first identity to the terminal device, so that when sending the measurement report of the first identity, the terminal device adds the measurement result of the at least one second identity to the measurement report.

In a possible embodiment, the at least one second identity is associated with a total quantity of reporting times, and the measurement result includes a measurement result of a second identity whose quantity of reporting times is less than the total quantity of reporting times.

According to this solution, since the second identity is associated with the total quantity of reporting times, the measurement result of the second identity in the measurement report received by the network device may be the measurement result of the second identity whose quantity of reporting times is less than the total quantity of reporting times of the second identity.

In a possible embodiment, the measurement report further includes a measurement result of a serving cell of the terminal device.

In a current measurement report, a measurement identity of each second identity includes the measurement result of the serving cell of the terminal device, resulting in some redundant reporting. According to this solution, the measurement report of the first identity carries the measurement result of the serving cell of the terminal device, so that transmitted data can be reduced, and redundant reporting can be avoided.

In a possible embodiment, the method further includes: The measurement configuration further includes first indication information, or the network device sends the first indication information to the terminal device, where the first indication information indicates the terminal device to send the measurement report of the first identity.

According to this solution, the network device may indicate the terminal device to send the measurement report of the first identity based on the first indication information, and does not need to receive the measurement report sent by the terminal device until the first period expires.

In a possible embodiment, if at least one second identity in the at least one second identity is associated with an indication for reporting a strongest neighboring cell of a serving cell of the terminal device, the measurement report further includes a measurement result of the strongest neighboring cell of the serving cell of the terminal device; or if at least one second identity in the at least one second identity is associated with an indication for reporting a specified measurement quantity type, the measurement report further includes a measurement result of the specified measurement quantity type of a serving cell of the terminal device.

According to this solution, the network device may indicate the terminal device to report the measurement result of the neighboring cell and the measurement result of the specified measurement quantity type.

In a possible embodiment, if at least one second identity in the at least one second identity is associated with a first value, and the first value indicates a maximum quantity of beams reported by the terminal device, the measurement report further includes a measurement result of a beam whose quantity does not exceed a second value and the second value is determined based on the first value.

The second value is a maximum value in a plurality of first values; or the second value is a minimum value in a plurality of first values; or if only one second identity in the at least one second identity is associated with the first value, the second value is the same as the first value.

According to this solution, the network device may indicate, based on the first value associated with the second identity, the terminal device to report measurement results of a specific quantity of beams of the serving cell.

According to a third aspect, a communication apparatus is provided. The communication apparatus provided in this application has a function of implementing behavior of the terminal device or the network device in the foregoing method aspects, and includes corresponding means configured to perform the operations or functions described in the foregoing method aspects. The operations or the functions may be implemented by using software, hardware (for example, a circuit), or a combination of hardware and software.

In a possible design, the apparatus includes one or more processors and a communication unit. The one or more processors are configured to support the apparatus to perform corresponding functions of the terminal device in the foregoing method, for example, performing measurement on a measurement object to obtain a measurement result. The communication unit is configured to support the apparatus to communicate with another device, to implement a receiving function and/or a sending function, for example, sending a measurement report of a first identity.

Optionally, the apparatus may further include one or more memories. The memory is coupled to the processor, and stores program instructions and/or data that are/is necessary for the network device. The one or more memories may be integrated with the processor, or may be disposed independent of the processor. This is not limited in this application.

The apparatus may be a mobile phone, a tablet computer, or the like, and the communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the terminal device in any one of the first aspect or the possible embodiments of the first aspect.

In a possible design, the apparatus includes one or more processors and a communication unit. The one or more processors are configured to support the apparatus to perform corresponding functions of the network device in the foregoing method, for example, making a decision based on the measurement report of the first identity. The communication unit is configured to support the apparatus to communicate with another device, to implement a receiving function and/or a sending function, for example, receiving the measurement report of the first identity.

Optionally, the apparatus may further include one or more memories. The memory is coupled to the processor, and stores program instructions and/or data that are/is necessary for the network device. The one or more memories may be integrated with the processor, or may be disposed independent of the processor. This is not limited in this application.

The apparatus may be a base station, an eNB, a gNB, a TRP, or the like. The communication unit may be a transceiver or a transceiver circuit. Optionally, the transceiver may alternatively be an input/output circuit or an interface.

The apparatus may alternatively be a communication chip. The communication unit may be an input/output circuit or an interface of the communication chip.

In another possible design, the apparatus includes a transceiver, a processor, and a memory. The processor is configured to control the transceiver or the input/output circuit to receive and send a signal, and the memory is configured to store a computer program. The processor is configured to run the computer program in the memory, to enable the apparatus to perform the method completed by the network device in any one of the second aspect or the possible embodiments of the second aspect.

According to a fourth aspect, a system is provided, where the system includes the foregoing terminal device and network device.

According to a fifth aspect, a computer-readable storage medium is provided, and is configured to store a computer program. The computer program includes instructions used to perform the method in any one of the first aspect or the possible embodiments of the first aspect.

According to a sixth aspect, a computer-readable storage medium is provided, and is configured to store a computer program. The computer program includes instructions used to perform the method in any one of the second aspect or the possible embodiments of the second aspect.

According to a seventh aspect, a computer program product is provided. The computer program product includes computer program code. When the computer program code is run on a computer, the computer is enabled to perform the method in any one of the first aspect or the possible embodiments of the first aspect.

According to an eighth aspect, a computer program product is provided. The computer program product includes computer program code. When the computer program code is run on a computer, the computer is enabled to perform the method in any one of the second aspect or the possible embodiments of the second aspect.

DESCRIPTION OF EMBODIMENTS

Figure 1:
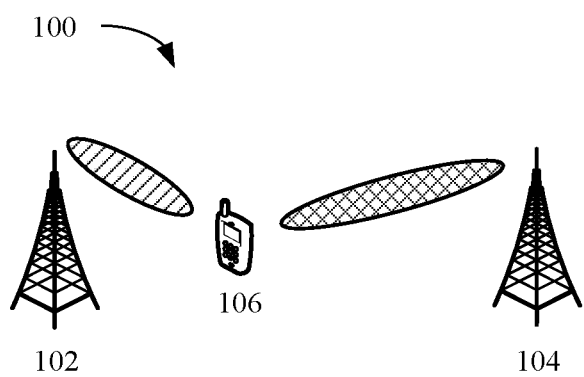
FIG. 1 is a schematic diagram of an architecture of a communication system according to an embodiment of this application.

The following describes technical solutions of this application with reference to accompanying drawings.

The following describes some terms in embodiments of this application, to facilitate understanding of a person skilled in the art.

(1) A terminal device in this application includes a device that provides a voice and/or data connectivity for a user. Specifically, the terminal device includes a device that provides a voice for the user, includes a device that provides data connectivity for the user, or includes a device that provides a voice and data connectivity for the user. For example, the terminal device may include a handheld device having a wireless connection function or a processing device connected to a wireless modem. The terminal may communicate with a core network through a radio access network (RAN), and exchange a voice or data with the RAN, or exchange a voice and data with the RAN. The terminal may include user equipment (UE), a wireless terminal, a mobile terminal, a device-to-device communication (D2D) terminal, a vehicle-to-everything (V2X) terminal, a machine-to-machine/machine type communication (M2M/MTC) terminal, an internet of things (IoT) terminal, a subscriber unit, a subscriber station, a mobile station, a remote station, an access point (AP), a remote terminal, an access terminal, a user terminal, a user agent, a user device, or the like. For example, the terminal may include a mobile phone (or referred to as a "cellular" phone), a computer with a mobile terminal, or a portable, pocket-sized, handheld, or computer built-in mobile apparatus. For example, it may be a device such as a personal communications service (PCS) phone, a cordless telephone set, a session initiation protocol (SIP) phone, a wireless local loop (WLL) station, or a personal digital assistant (PDA). The terminal may alternatively include a limited device, for example, a device with relatively low power consumption, a device with a limited storage capability, or a device with a limited computing capability. For example, the terminal includes an information sensing device such as a barcode, radio frequency identification (RFID), a sensor, a global positioning system (GPS), or a laser scanner.

By way of example and not limitation, in this embodiment of this application, the terminal may alternatively be a wearable device. The wearable device may also be referred to as a wearable intelligent device, an intelligent wearable device, or the like, and is a general term of wearable devices that are intelligently designed and developed for daily wear by using a wearable technology, for example, glasses, gloves, watches, clothes, and shoes. The wearable device is a portable device that can be directly worn on the body or integrated into clothes or an accessory of a user. The wearable device is not only a hardware device, but also implements a powerful function through software support, data exchange, and cloud interaction. In a broad sense, wearable intelligent devices include full-featured and large-sized devices that can implement all or a part of functions without depending on smartphones, for example, smart watches or smart glasses, and include devices that focus on only one type of application function and need to collaboratively work with other devices such as smartphones, for example, various smart bands, smart helmets, or smart jewelry for monitoring physical signs.

If the various terminals described above are located on a vehicle (for example, placed in the vehicle or installed in the vehicle), the terminals may be considered as vehicle-mounted terminals. For example, the vehicle-mounted terminal is also referred to as an on board unit (OBU).

In the embodiments of this application, an apparatus configured to implement a function of a terminal may be a terminal, or may be an apparatus, for example, a chip system, that can support the terminal in implementing the function. The apparatus may be installed in the terminal. In this embodiment of this application, the chip system may include a chip, or may include a chip and another discrete component. In the technical solutions provided in the embodiments of this application, an example in which an apparatus for implementing a function of a terminal is a terminal is used to describe the technical solutions provided in the embodiments of this application.

(2) A network device in this application includes, for example, an access network (AN) device such as a base station (for example, an access point), and may be a device that is in an access network and that communicates with a wireless terminal communication device over an air interface through one or more cells. Alternatively, the network device is, for example, a road side unit (RSU) in a vehicle to everything (V2X) technology. The base station may be configured to mutually convert a received over-the-air frame and an IP packet, and serve as a router between the terminal and a remaining part of the access network. The remaining part of the access network may include an IP network. The RSU may be a fixed infrastructure entity supporting a V2X application, and may exchange a message with another entity supporting the V2X application. The network device may further coordinate attribute management of the air interface. For example, the network device may include an evolved NodeB (NodeB, eNB, or e-NodeB, evolutional NodeB) in a long term evolution (LTE) system or a long term evolution-advanced (LTE-A) system, may include a next generation NodeB (gNB) in an evolved packet core (EPC) network, a 5th (5G) generation mobile communication technology, or a new radio (NR) system (also referred to as an NR system for short), or may include a centralized unit (CU) and a distributed unit (DU) in a cloud access network (Cloud RAN) system. This is not limited in the embodiments of this application.

The network device may further include a core network device, and the core network device includes, for example, an access and mobility management function (AMF).

In embodiments of this application, an apparatus configured to implement a function of a network device may be a network device, or may be an apparatus, for example, a chip system, that can support the network device in implementing the function. The apparatus may be installed in the network device. In the technical solutions provided in embodiments of this application, an example in which an apparatus for implementing a function of a network device is a network device is used to describe the technical solutions provided in embodiments of this application.

(3) A first identity may be an identity used to identify one unified reporting. One first identity may be associated with one reporting period (for example, a first period) and at least one second identity. The unified reporting herein may mean that measurement results of a group of second identities are carried in one measurement report for reporting. It should be understood that a second identity in the group of second identities may be the at least one second identity associated with the first identity.

It should be noted that the network device may configure, for the terminal device based on an RRM requirement, one unified reporting of a first period and a second identity associated with the first identity. Measurement identified by the second identity associated with the first identity may have a same or similar RRM objective. For example, the network device may associate a second identity for a mobility management (for example, cell handover) objective with a first identity A, and associate a second identity for a multi-carrier management (for example, carrier aggregation (CA) or dual connectivity (for example, (multi-radio dual connectivity) MR-DC)) objective with a first identity B.

(4) A second identity may be an identity used to identify one measurement, for example, a measurement identity. One second identity is associated with one measurement object and one report configuration. The measurement object is an object measured by the terminal device, and the report configuration includes a reporting criterion and a reporting format. The reporting criterion herein may be a requirement that is met when the terminal device reports the measurement result to the network device. For example, if the reporting criterion is −110 dB, when the measurement result of the second identity meets −110 dB, the measurement result of the second identity is sent to the network device. The reporting format is a format used when the terminal device sends the measurement result.

(5) Terms "system" and "network" may be used interchangeably in embodiments of this application. "A plurality of" means two or more than two, and another quantifier is similar to this. The term "and/or" describes an association relationship for describing associated objects and represents that three relationships may exist. For example, A and/or B may represent the following three cases: Only A exists, both A and B exist, and only B exists. In addition, an element that appears in singular forms "a", "an", and "the" does not mean "one or only one" unless otherwise specified in the context, but means "one or more". For example, "a device" means one or more such devices. Further, "at least one (at least one of) . . . " means one or any combination of subsequent associated objects. For example, "at least one of A, B, and C" includes A, B, C, AB, AC, BC, or ABC.

The technical solutions in embodiments of this application may be applied to various communication systems, for example, a long term evolution (LTE) system, a worldwide interoperability for microwave access (WiMAX) communication system, a future 5th generation (5G) system such as a new radio access technology (NR), and a future communication system such as a 6G system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompany drawings. In addition, a combination of these solutions may be used.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that: With the evolution of the network architecture and the emergence of new service scenarios, the technical solutions provided in embodiments of this application are also applicable to similar technical problems.

Embodiments of this application may be used in a conventional typical network or a future UE-centric network. A non-cell network architecture is introduced to the UE-centric network. To be specific, a large quantity of small cells are deployed in a specific area to form a hyper cell. Each small cell is a transmission point (TP) or a transmission reception point (TRP) of the hyper cell, and is connected to a centralized controller. When UE moves in the hyper cell, a network side device selects a new sub-cluster for the UE in real time to serve the UE, to avoid a real cell handover, and implement UE service continuity. The network side device includes a wireless network device. Alternatively, in the UE-centric network, a plurality of network side devices such as small cells may have independent controllers such as distributed controllers. Each small cell can independently schedule a user, and information is exchanged between small cells for a long time, so that the small cell can provide a coordinated service for the UE flexibly to some extent.

In embodiments of this application, different base stations may be base stations having different identities, or may be base stations that have a same identity and that are deployed at different geographical locations. Before being deployed, a base station does not know whether the base station is related to a scenario to which embodiments of this application are applied. Therefore, before being deployed, the base station or a baseband chip needs to support a method provided in embodiments of this application. It may be understood that the foregoing base stations having different identities may have base station identifications, cell identities, or other identities.

In embodiments of this application, an NR network scenario in a wireless communication network is used as an example to describe some scenarios. It should be noted that the solutions in embodiments of this application may further be applied to another wireless communication network, and a corresponding name may also be replaced with a name of a corresponding function in the another wireless communication network.

For ease of understanding embodiments of this application, a communication system shown in FIG. 1 is first used as an example to describe in detail a communication system applicable to embodiments of this application. FIG. 1 is a schematic diagram of a communication system to which a communication method according to an embodiment of this application is applicable. As shown in FIG. 1, the communication system 100 includes a network device 102 and a terminal device 106. A plurality of antennas may be configured for the network device 102, and a plurality of antennas may also be configured for the terminal device. Optionally, the communication system may further include a network device 104, and a plurality of antennas may also be configured for the network device 104.

It should be understood that the network device 102 or the network device 104 may further include a plurality of components (for example, a processor, a modulator, a multiplexer, a demodulator, or a de-multiplexer) related to signal sending and receiving.

In the communication system 100, the network device 102 and the network device 104 each may communicate with a plurality of terminal devices (for example, the terminal device 106 shown in the figure). The network device 102 and the network device 104 may communicate with one or more terminal devices similar to the terminal device 106. However, it should be understood that a terminal device communicating with the network device 102 and a terminal device communicating with the network device 104 may be the same or may be different. The terminal device 106 shown in FIG. 1 may simultaneously communicate with the network device 102 and the network device 104. However, only one possible scenario is shown. In some scenarios, the terminal device may communicate with only the network device 102 or the network device 104. This is not limited in this application.

It should be understood that FIG. 1 is merely a simplified schematic diagram used as an example for ease of understanding. The communication system may further include another network device or another terminal device that is not shown in FIG. 1.

The following describes embodiments of this application in detail with reference to the accompanying drawings.

It should be understood that the technical solutions in this application may be applied to a wireless communication system, for example, the communication system 100 shown in FIG. 1. The communication system may include at least one network device and at least one terminal device, and the network device and the terminal device may communicate with each other through a radio air interface. For example, the network device in the communication system may correspond to the network device 102 and the network device 104 shown in FIG. 1, and the terminal device may correspond to the terminal device 106 shown in FIG. 1.

Without loss of generality, the following describes embodiments of this application in detail by using an interaction process between a terminal device and a network device as an example. The terminal device may be a terminal device that is in a wireless communication system and that has a wireless connection relationship with the network device. It may be understood that the network device may communicate with a plurality of terminal devices that have a wireless connection relationship with the network device in the wireless communication system based on a same technical solution. This is not limited in this application.

Figure 2:
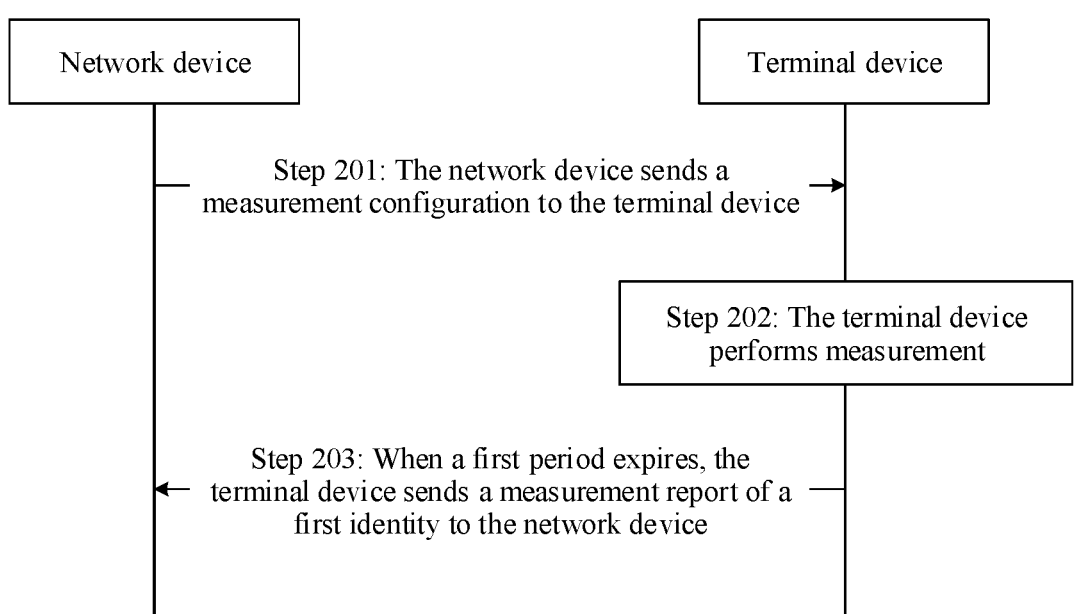
FIG. 2 is an example flowchart of a communication method according to an embodiment of this application.

FIG. 2 is an example flowchart of a communication method from a device interaction perspective according to an embodiment of this application. As shown in FIG. 2, the method may include the following operations.

Operation 201: A network device sends a measurement configuration to a terminal device.

In this embodiment of this application, the network device may indicate one unified reporting to the terminal device. In an example, the measurement configuration may include a first period. The first period is a first period in which at least one second identity reports a measurement report, that is, at least one second identity may be associated with the first period. The second identity associated with the first period may be at least one second identity that has been sent by the network device. For example, the network device sends a second identity 1 and a second identity 2 to the terminal device, and the network device further sends a measurement configuration to the terminal device, where the measurement configuration includes a first period. In this case, the terminal device may determine that the second identity 1 and the second identity 2 are associated with the first period. When the first period expires, the terminal device may send a measurement report carrying the second identity 1 and a measurement result of the second identity 1 as well as the second identity 2 and a measurement result of the second identity 2 to the network device.

In another example, the measurement configuration may further include a first period and at least one second identity. When the first period expires, the terminal device may send a measurement report carrying the at least one second identity and a measurement result of the at least one second identity to the network device.

The network device may further add a first identity to the measurement configuration. In other words, the measurement configuration herein may include a first identity and a first period of the first identity. The first period may be preconfigured based on an empirical value. This is not specifically limited in this application. The first period is a period in which the terminal device needs to send a measurement report of the first identity to the network device. For example, when receiving the measurement configuration, the terminal device starts timing, and when duration reaches the first period, it may indicate that the first period expires.

For example, after receiving the measurement configuration sent by the network device, the terminal device may start a first timer. When the first timer times out, it may indicate that the first period expires. After the first period expires, the terminal device may restart the first timer.

In an embodiment, if the measurement configuration further includes at least one second identity, the at least one second identity may be considered as a second identity associated with the first identity. If the measurement configuration does not include a second identity, it may be considered that all second identities that have been sent by the network device to the terminal device are associated with the first identity. For example, the network device sends a second identity A, a second identity B, and a second identity C to the terminal device. The network device further sends a measurement configuration to the terminal device, where the measurement configuration includes a first identity and a first period of the first identity. In this case, the terminal device may consider that the second identity A, the second identity B, and the second identity C are associated with the first identity.

In another embodiment, the network device may further send a second identity list associated with the first identity to the terminal device. The second identity list may include one or more second identities. For example, the network device sends a measurement configuration to the terminal device, where the measurement configuration includes a first identity A and a first period of the first identity A. The network device further sends the first identity A and a second identity list to the terminal device. In this case, the terminal device may consider that a second identity in the second identity list is a second identity associated with the first identity A.

In this embodiment of this application, the network device may indicate several unified reportings to the terminal device. In an embodiment, the measurement configuration may further include a plurality of first identities and a first period of each first identity. For example, the measurement configuration may further include at least one second identity associated with each first identity. Alternatively, the network device may further send a second identity list associated with each first identity to the terminal device.

Figure 3:
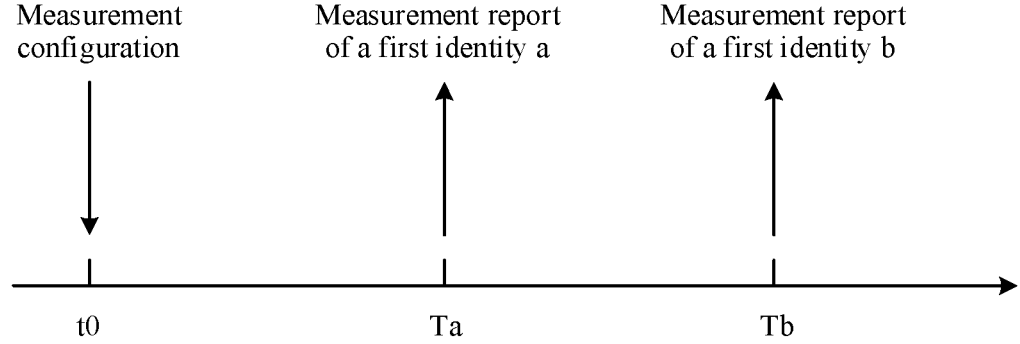
FIG. 3 is one of sequence diagrams of sending a measurement report by a terminal device according to an embodiment of this application.

As shown in FIG. 3, the terminal device receives, at a moment to, a measurement configuration sent by the network device. The measurement configuration includes a first identity a, a second identity list A associated with the first identity a, a first period of the first identity a, a first identity b, a second identity list B associated with the first identity b, and a first period of the first identity b. The second identity list A includes a second identity 1 and a second identity 2, and the second identity list B includes a second identity 3 and a second identity 4. The terminal device separately performs measurement on measurement objects to obtain measurement results. When the first period of the first identity a arrives at a moment Ta, the terminal device sends a measurement report, of the first identity a, carrying measurement results of the second identity 1 and the second identity 2 to the network device. When the first period of the first identity b arrives at a moment Tb, the terminal device sends a measurement report, of the first identity b, carrying measurement results of the second identity 3 and the second identity 4 to the network device.

In this embodiment of this application, the network device may further reconfigure the first period of the first identity. For example, the network device sends a measurement configuration to the terminal device, where the measurement configuration includes a first identity A and a first period 10 s of the first identity A. The network device further sends the first identity A and a second period 5 s of the first identity A to the terminal device. In this case, after receiving the measurement configuration including the first identity A and the second period 5 s of the first identity A, the terminal device may send a measurement report of the first identity A to the network device every 5 s.

Operation 202: The terminal device performs measurement.

The terminal device may perform measurement based on the second identity associated with the first identity. The second identity is associated with a measurement object and a report configuration. The terminal device may perform measurement on the measurement object associated with the second identity.

It should be understood that the terminal device may first perform operation 201 and then perform operation 202, or first perform operation 202 and then perform operation 201, or simultaneously perform operation 201 and operation 202.

Operation 203: When the first period expires, the terminal device sends a measurement report of the first identity to the network device.

If the measurement configuration includes the first period, the measurement report may include at least one second identity and a measurement result of the at least one second identity. For example, the measurement result may be a measurement result of at least one second identity associated with the first period. If the measurement configuration includes a first identity and a first period of the first identity, the measurement report may include the first identity and a measurement result of the first identity, where the measurement result of the first identity includes a measurement result of at least one second identity. The at least one second identity is a second identity associated with the first identity. For example, the measurement report may include a measurement result of a second identity in the second identity list associated with the first identity.

For example, the network device sends a plurality of second identities to the terminal device, which are respectively a second identity 1, a second identity 2, and a second identity 3. The terminal device may separately perform measurement on measurement objects based on the second identity 1, the second identity 2, and the second identity 3, to obtain measurement results. The network device further sends a measurement configuration to the terminal device, where the measurement configuration includes a first period. In this case, the terminal device may consider that the second identity 1, the second identity 2, and the second identity 3 are associated with the first period. When the first period expires, the terminal device may send a measurement report carrying the measurement results of the second identity 1, the second identity 2, and the second identity 3 to the network device.

Alternatively, the measurement configuration includes a first identity and a first period of the first identity. In this case, the terminal device may consider that the second identity 1, the second identity 2, and the second identity 3 are associated with the first identity. When the first period expires, the terminal device may send a measurement report carrying the measurement results of the second identity 1, the second identity 2, and the second identity 3 to the network device.

It should be noted herein that the measurement result of the at least one second identity in the measurement report may be a measurement result that meets a reporting criterion. For example, a measurement result of the second identity 1 meets a reporting criterion associated with the second identity 1, a measurement result of the second identity 2 does not meet a reporting criterion of the second identity 2, and a measurement result of the second identity 3 meets a reporting criterion of the second identity 3. Therefore, the terminal device may send a measurement report carrying the measurement results of the second identity 1 and the second identity 3 to the network device.

Figure 4:
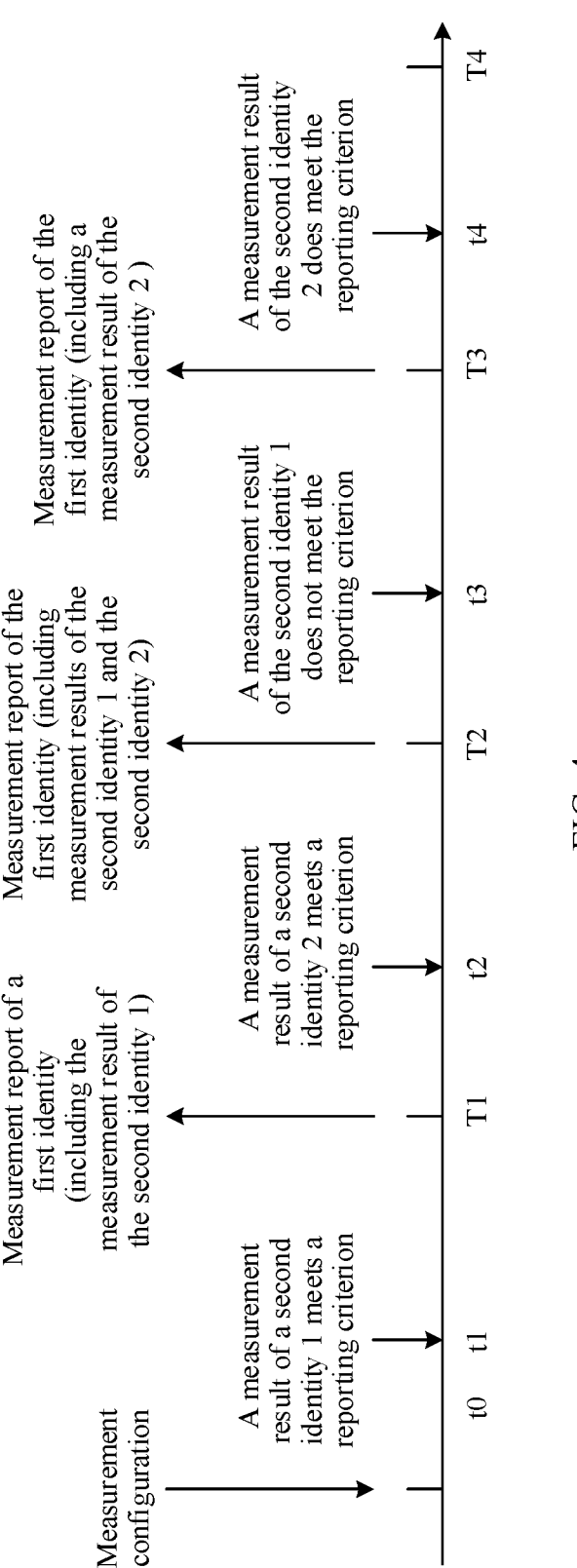
FIG. 4 is one of sequence diagrams of sending a measurement report by a terminal device according to an embodiment of this application.

As shown in FIG. 4, the terminal device receives, at a moment to, a measurement configuration sent by the network device, where the measurement configuration includes a first identity, a first period of the first identity, and a second identity list associated with the first identity. The second identity list includes a second identity 1 and a second identity 2. The terminal device may perform measurement on measurement objects based on the second identity 1 and the second identity 2, to obtain measurement results. The terminal device determines, at a moment t1, that a measurement result of the second identity 1 meets a reporting criterion. When the first period expires at a moment T1, the terminal device may send a measurement report carrying the measurement result of the second identity 1 to the network device. The terminal device determines, at a moment t2, that a measurement result of the second identity 2 meets a reporting criterion. When the first period expires for the second time at a moment T2, the terminal device may send a measurement report carrying measurement results of the second identity 1 and the second identity 2 to the network device. The terminal device determines, at a moment t3, that a measurement result of the second identity 1 does not meet the reporting criterion. When the first period expires for the third time at a moment T3, the terminal device may send a measurement report carrying a measurement result of the second identity 2 to the network device. The terminal device determines, at a moment t4, that a measurement result of the second identity 2 does not meet the reporting criterion. When the first period expires for the fourth time at a moment T4, since neither the measurement result of the second identity 1 nor the measurement result of the second identity 2 meet their respective reporting criterion, the terminal device may not send a measurement report to the network device.

In addition, it should be noted that, if the second identity 1 is an identity that needs to be reported only once, the measurement result of the second identity 1 has been reported once at the moment T1. Therefore, the measurement result of the second identity 1 is not reported at the moment T2 and the moment T3. At the moment T2 and the moment T3, the measurement report of the first identity includes the measurement result of the second identity 2. Similarly, if the second identity 2 is an identity that needs to be reported only once, at the moment T2 and the moment T3, the measurement report of the first identity includes the measurement result of the second identity 1. Which identities need to be reported only once may be configured by the network device, or may be preset. For example, some second identities may be preset as identities that need to be reported only once, or some second identities may be preset as identities that need to be reported periodically. Periodic reporting indicates that the measurement result needs to be reported for a plurality of times.

In an embodiment, the measurement result of the second identity in the measurement report may be obtained by the terminal device through measurement within the first period. For example, the measurement configuration sent by the network device includes a first identity, a period of the first identity, and a second identity list associated with the first identity. The terminal device may separately perform measurement on measurement objects within the first period based on the second identity list to obtain measurement results. In this case, when the first period expires, the terminal device may send a measurement report, of the first identity, carrying the measurement result of the second identity in the second identity list to the network device.

In another embodiment, the measurement result of the second identity in the measurement report may alternatively be obtained by the terminal device through measurement after the terminal device receives the second identity. For example, the network device sends a second identity 1, a second identity 2, and a second identity 3 to the terminal device. The terminal device may separately perform measurement on measurement objects based on the foregoing second identities, to obtain measurement results. The terminal device further receives a measurement configuration sent by the network device, where the measurement configuration includes a first identity and a first period of the first identity. In this case, when receiving the measurement configuration, the terminal device starts timing, and when the first period expires, the terminal device sends a measurement report, of the first identity, carrying the measurement results of the second identity 1, the second identity 2, and the second identity 3 to the network device.

In this embodiment of this application, the report configuration of the second identity further includes a total quantity of reporting times. The following specifically describes how the terminal sends the measurement report of the first identity to the network device based on the total quantity of reporting times.

Example 1

In the measurement configuration sent by the network device, the first identity is further associated with a first threshold. If there are a plurality of first identities in the measurement configuration, the network device may configure one first threshold for each first identity. Alternatively, the network device may configure one first threshold for the plurality of first identities, that is, the measurement configuration may include one first threshold.

The terminal device may perform measurement on a serving cell or a primary serving cell. If a measurement result of the serving cell or the primary serving cell is lower than the first threshold, the terminal device needs to send a measurement report of the first identity to the network device. The terminal device may further increase a quantity of reporting times of the second identity included in the measurement report by a specified value. The first threshold may be preconfigured based on an empirical value. This is not specifically limited in this application. When reporting the measurement report after the first period expires, the terminal device may send a measurement report carrying a measurement result of a second identity whose quantity of reporting times is less than or equal to the total quantity of reporting times in the second identity to the network device.

In an embodiment, an initial quantity of reporting times of the second identity may be 0. Before sending the measurement report of the first identity, the terminal device may increase the quantity of reporting times of the second identity included in the measurement report by 1. When reporting the measurement report, the terminal device may send a measurement report carrying a measurement result of a second identity whose quantity of reporting times is less than or equal to the total quantity of reporting times in the second identity to the network device.

In another embodiment, an initial quantity of reporting times of the second identity may be 1. Before sending the measurement report of the first identity, the terminal device may increase the quantity of reporting times of the second identity included in the measurement report by 1. When the first period expires, the terminal device sends a measurement report carrying a measurement result of a second identity whose quantity of reporting times is less than or equal to the total quantity of reporting times in the second identity to the network device.

In yet another embodiment, an initial quantity of reporting times of the second identity may be 0. After sending the measurement report of the first identity, the terminal device may increase the quantity of reporting times of the second identity included in the measurement report by 1. When the first period expires, the terminal device sends a measurement report carrying a measurement result of a second identity whose quantity of reporting times is less than the total quantity of reporting times in the second identity to the network device.

It should be understood that, in this embodiment of this application, the initial quantity of reporting times of the second identity may be configured by the network device, or may be preset. In addition, in this embodiment of this application, how the terminal device increases the quantity of reporting times by 1 may also be preset. The terminal device may increase the quantity of reporting times of the second identity by 1 after reporting the measurement report, or may increase the quantity of reporting times of the second identity by 1 before reporting the measurement report. When reporting the measurement report, the terminal device may add, to the measurement report, a measurement result of a second identity whose quantity of reporting times is less than the total quantity of reporting times, or may add, to the measurement report, a measurement result of a second identity whose quantity of reporting times is less than or equal to the total quantity of reporting times.

According to this solution, when the measurement result of the serving cell or the primary cell of the terminal device is less than the first threshold, it may indicate that the serving cell or the primary cell cannot provide a good communication service for the terminal device, and the terminal device may need to perform cell handover. In this case, the terminal device sends the measurement report of the first identity to the network device, so that the network device can make a decision based on the measurement report.

Figure 5:
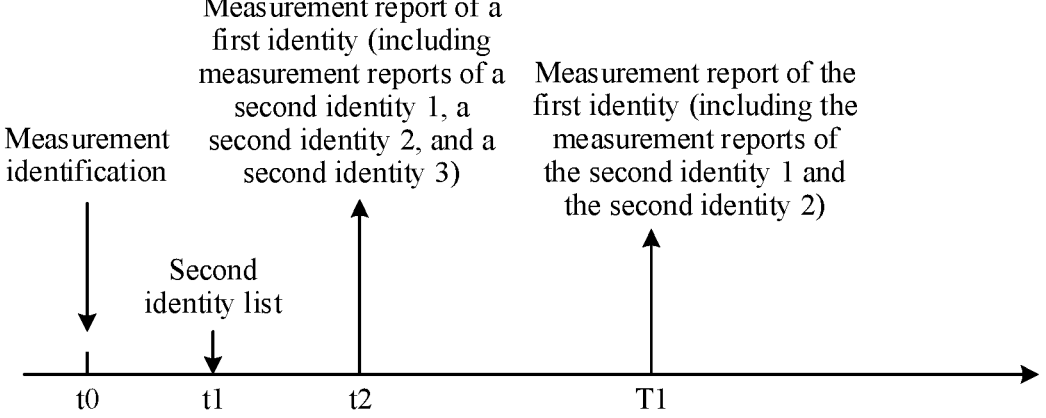
FIG. 5 is one of sequence diagrams of sending a measurement report by a terminal device according to an embodiment of this application.

As shown in FIG. 5, the terminal device receives, at a moment to, a measurement configuration sent by the network device. The measurement configuration includes a first identity, a first period of the first identity, and a first threshold −98 dB. The terminal device receives, at a moment t1, a second identity list that is associated with the first identity and that is sent by the network device, where the second identity list includes a second identity 1, a second identity 2, and a second identity 3. In this case, the terminal device may separately perform measurement on measurement objects based on the second identity list, to obtain measurement results. The terminal device determines that a measurement result of a serving cell is less than −98 dB. Therefore, the terminal device sends a measurement report of the first identity to the network device at a moment t2. After sending the measurement report, the terminal device may separately increase a quantity of reporting times of the second identity 1, a quantity of reporting times of the second identity 2, and a quantity of reporting times of the second identity 3 by 1. An initial quantity of reporting times of each second identity is 1. In this case, the quantity of reporting times of the second identity 1 is 2 and is equal to a total quantity of reporting times 2, the quantity of reporting times of the second identity 2 is 2 and is less than a total quantity of reporting times 3, and the quantity of reporting times of the second identity 3 is 2 and is greater than a total quantity of reporting times 1. When the first period expires at a moment T1, the terminal device may send a measurement report, of the first identity, carrying measurement results of the second identity 1 and the second identity 2 to the network device, and may separately increase the quantity of reporting times of the second identity 1, the quantity of reporting times of the second identity 2, and the quantity of reporting times of the second identity 3 by 1. In this case, the quantity of reporting times of the second identity 1 is 3 and is greater than a total quantity of reporting times 2, the quantity of reporting times of the second identity 2 is 3 and is equal to a total quantity of reporting times 3, and the quantity of reporting times of the second identity 3 is 3 and is greater than a total quantity of reporting times 1.

Example 2

The network device may send a first indication to the terminal device, or the network device may add the first indication to a measurement configuration. The first indication herein may indicate the terminal device to send a measurement report of a first identity. After receiving the first indication, the terminal device may send the measurement report of the first identity to the network device. The terminal device may further increase a quantity of reporting times of the second identity included in the measurement report by a specified value. When reporting the measurement report after the first period expires, the terminal device may send a measurement report carrying a measurement result of a second identity whose quantity of reporting times is less than or equal to the total quantity of reporting times in the second identity to the network device.

In an embodiment, an initial quantity of reporting times of the second identity may be 0. Before sending the measurement report of the first identity, the terminal device may increase the quantity of reporting times of the second identity included in the measurement report by 1. When reporting the measurement report, the terminal device may send a measurement report carrying a measurement result of a second identity whose quantity of reporting times is less than or equal to the total quantity of reporting times in the second identity to the network device.

In another embodiment, an initial quantity of reporting times of the second identity may be 1. Before sending the measurement report of the first identity, the terminal device may increase the quantity of reporting times of the second identity included in the measurement report by 1. When the first period expires, the terminal device sends a measurement report carrying a measurement result of a second identity whose quantity of reporting times is less than or equal to the total quantity of reporting times in the second identity to the network device.

In yet another embodiment, an initial quantity of reporting times of the second identity may be 0. After sending the measurement report of the first identity, the terminal device may increase the quantity of reporting times of the second identity included in the measurement report by 1. When the first period expires, the terminal device sends a measurement report carrying a measurement result of a second identity whose quantity of reporting times is less than the total quantity of reporting times in the second identity to the network device.

It should be understood that, in this embodiment of this application, the initial quantity of reporting times of the second identity may be configured by the network device, or may be preset. In addition, in this embodiment of this application, how the terminal device increases the quantity of reporting times by 1 may also be preset. The terminal device may increase the quantity of reporting times of the second identity by 1 after reporting the measurement report, or may increase the quantity of reporting times of the second identity by 1 before reporting the measurement report. When reporting the measurement report, the terminal device may add, to the measurement report, a measurement result of a second identity whose quantity of reporting times is less than the total quantity of reporting times, or may add, to the measurement report, a measurement result of a second identity whose quantity of reporting times is less than or equal to the total quantity of reporting times.

Figure 6:
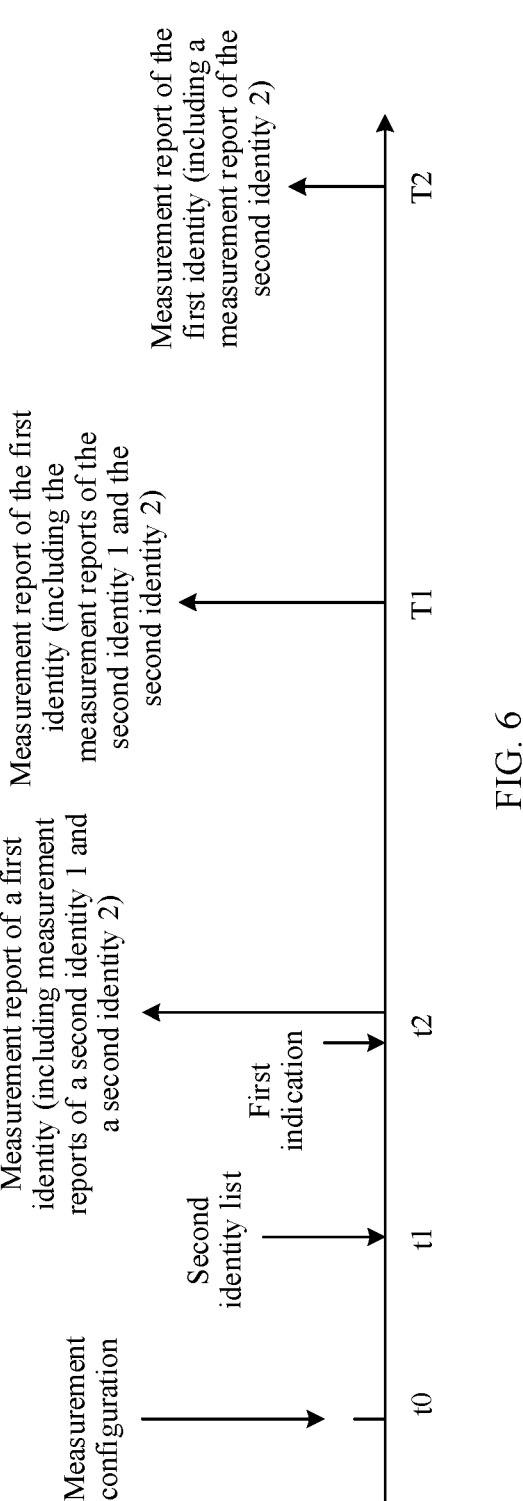
FIG. 6 is one of sequence diagrams of sending a measurement report by a terminal device according to an embodiment of this application.

As shown in FIG. 6, the terminal device receives, at a moment t0, a measurement configuration sent by the network device. The measurement configuration includes a first identity and a first period of the first identity. The terminal device receives, at a moment t1, a second identity list that is associated with the first identity and that is sent by the network device, where the list includes a second identity 1 and a second identity 2. The terminal device may separately perform measurement on measurement objects based on the list, to obtain measurement results. If the terminal device receives, at a moment t2, a first indication sent by the network device, the terminal device may separately increase a quantity of reporting times of the second identity 1 and a quantity of reporting times of the second identity 2 by 1. Since both an initial quantity of reporting times of the second identity 1 and an initial quantity of reporting times of the second identity 2 are 0, the quantity of reporting times of the second identity 1 is 1 and is less than a total quantity of reporting times 2 of the second identity 1, and the quantity of reporting times of the second identity 2 is 1 and is less than a total quantity of reporting times 3 of the second identity 2. The terminal device may send, at the moment t2, a measurement report carrying measurement results of the second identity 1 and the second identity 2 to the network device. When the first period expires at a moment T1, the terminal device may separately increase the quantity of reporting times of the second identity 1 and the quantity of reporting times of the second identity 2 by 1. In this case, the quantity of reporting times of the second identity 1 is 2 and is equal to a total quantity of reporting times 2 of the second identity 1, and the quantity of reporting times of the second identity 2 is 2 and is less than a total quantity of reporting times 3 of the second identity 2. Therefore, the terminal device may send a measurement report carrying the measurement results of the second identity 1 and the second identity 2 to the network device. When the first period expires again at a moment T2, the terminal device may separately increase the quantity of reporting times of the second identity 1 and the quantity of reporting times of the second identity 2 by 1. In this case, the quantity of reporting times of the second identity 1 is 3 and is greater than a total quantity of reporting times 2 of the second identity 1, and the quantity of reporting times of the second identity 2 is 3 and is equal to a total quantity of reporting times 3 of the second identity 2. Therefore, the terminal device may send, at the moment T2, a measurement report carrying a measurement result of the second identity 2 to the network device.

In an embodiment, if the first indication may further include a first identity. For example, the measurement configuration sent by the network device to the terminal device includes a first identity 1 and a first period of the first identity 1, and a first identity 2 and a first period of the first identity 2. The terminal device may separately perform measurement on measurement objects, to obtain measurement results. The network device further sends a first indication to the terminal device, where the first indication includes the first identity 1. In this case, the terminal device needs to send a measurement report of the first identity 1 to the network device.

In another embodiment, if the first indication does not carry a first identity, the terminal device needs to send a measurement report of each first identity to the network device. For example, the measurement configuration sent by the network device to the terminal device includes a first identity 1 and a first period of the first identity 1, and a first identity 2 and a first period of the first identity 2. The terminal device may separately perform measurement on measurement objects, to obtain measurement results. The network device further sends a first indication to the terminal device, and the first indication does not carry a first identity. In this case, the terminal device needs to send measurement reports of the first identity 1 and the first identity 2 to the network device.

Example 3

The terminal device may send a measurement report of a first identity to the network device when the first period expires. The terminal device may further increase a quantity of reporting times of the second identity included in the measurement report by a specified value. When reporting the measurement report again after the first period expires, the terminal device may send a measurement report carrying a measurement result of a second identity whose quantity of reporting times is less than or equal to the total quantity of reporting times in the second identity to the network device.

In an embodiment, an initial quantity of reporting times of the second identity may be 0. Before sending the measurement report of the first identity, the terminal device may increase the quantity of reporting times of the second identity included in the measurement report by 1. When reporting the measurement report, the terminal device may send a measurement report carrying a measurement result of a second identity whose quantity of reporting times is less than or equal to the total quantity of reporting times in the second identity to the network device.

In another embodiment, an initial quantity of reporting times of the second identity may be 1. Before sending the measurement report of the first identity, the terminal device may increase the quantity of reporting times of the second identity included in the measurement report by 1. When the first period expires, the terminal device sends a measurement report carrying a measurement result of a second identity whose quantity of reporting times is less than or equal to the total quantity of reporting times in the second identity to the network device.

In yet another embodiment, an initial quantity of reporting times of the second identity may be 0. After sending the measurement report of the first identity, the terminal device may increase the quantity of reporting times of the second identity included in the measurement report by 1. When the first period expires, the terminal device sends a measurement report carrying a measurement result of a second identity whose quantity of reporting times is less than the total quantity of reporting times in the second identity to the network device.

It should be understood that, in this embodiment of this application, the initial quantity of reporting times of the second identity may be configured by the network device, or may be preset. In addition, in this embodiment of this application, how the terminal device increases the quantity of reporting times by 1 may also be preset. The terminal device may increase the quantity of reporting times of the second identity by 1 after reporting the measurement report, or may increase the quantity of reporting times of the second identity by 1 before reporting the measurement report. When reporting the measurement report, the terminal device may add, to the measurement report, a measurement result of a second identity whose quantity of reporting times is less than the total quantity of reporting times, or may add, to the measurement report, a measurement result of a second identity whose quantity of reporting times is less than or equal to the total quantity of reporting times.

Figure 7:
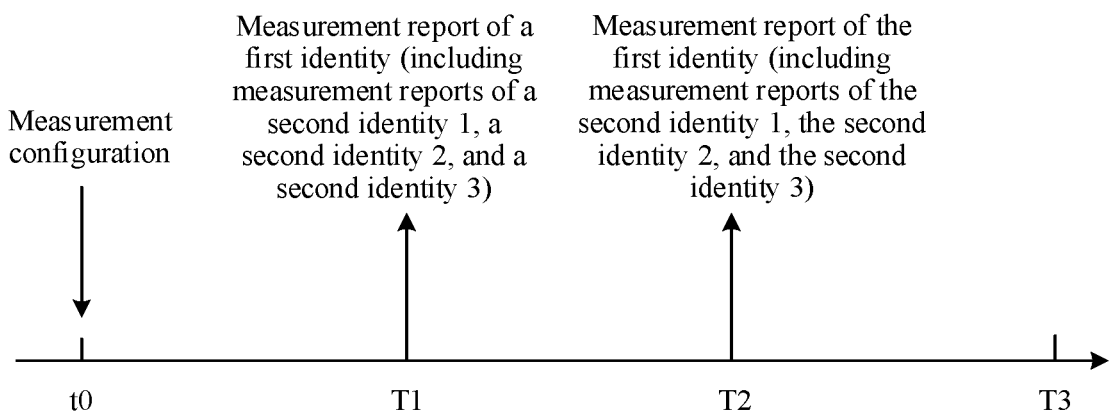
FIG. 7 is one of sequence diagrams of sending a measurement report by a terminal device according to an embodiment of this application.

As shown in FIG. 7, the network device sends a measurement configuration to the terminal device at a moment t0. The measurement configuration includes a first identity, a first period of the first identity, and a second identity list, and the second identity list includes a second identity 1, a second identity 2, and a second identity 3. The terminal device may start a first timer, and duration of the first timer is the first period. The terminal device separately performs measurement on measurement objects to obtain measurement results. When the first timer times out at a moment T1, the terminal device may send a measurement report carrying the measurement results of the second identity 1, the second identity 2, and the second identity 3 to the network device, and restart the first timer. After sending the measurement report, the terminal device may separately increase a quantity of reporting times of the second identity 1, a quantity of reporting times of the second identity 2, and a quantity of reporting times of the second identity 3 by 1. Since an initial quantity of reporting times of each second identity is 1, the quantity of reporting times of the second identity 1 is 2 and is equal to a total quantity of reporting times 2 of the second identity 1, the quantity of reporting times of the second identity 2 is 2 and is equal to a total quantity of reporting times 2 of the second identity 2, and the quantity of reporting times of the second identity 3 is 2 and is equal to a total quantity of reporting times 2 of the second identity 3. When the first timer times out at a moment T2, the terminal device may send a measurement report carrying measurement results of a second identity 1, a second identity 2, and a second identity 3 whose quantity of reporting times is less than or equal to the total quantity of reporting times to the network device, and restart the first timer. After sending the measurement report, the terminal device may separately increase the quantity of reporting times of the second identity 1, the quantity of reporting times of the second identity 2, and the quantity of reporting times of the second identity 3 by 1. In this case, the quantity of reporting times of the second identity 1 is 3 and is greater than a total quantity of reporting times 2, the quantity of reporting times of the second identity 2 is 3 and is greater than a total quantity of reporting times 2 of the second identity 2, and the quantity of reporting times of the second identity 3 is 3 and is greater than a total quantity of reporting times 2 of the second identity 3. The first timer times out at a moment T3. Since the quantity of reporting times of the second identity 1, the quantity of reporting times of the second identity 2, and the quantity of reporting times of the second identity 3 are all greater than their respective total quantity of reporting times, the terminal device may not send the measurement report of the first identity to the network device.

Figure 8:
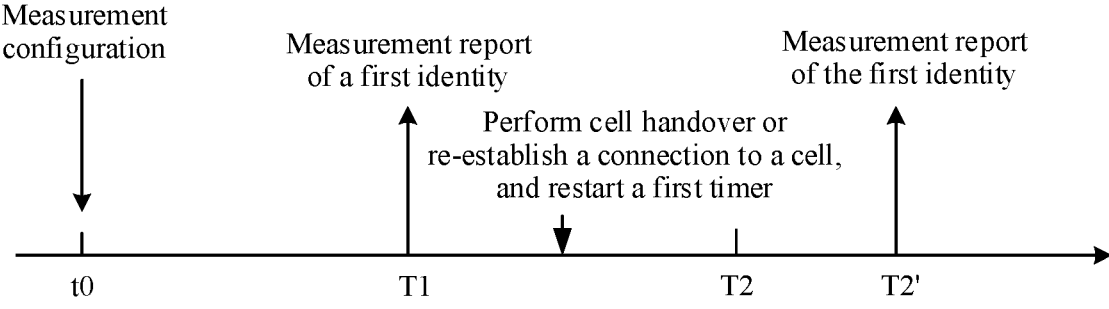
FIG. 8 is one of sequence diagrams of sending a measurement report by a terminal device according to an embodiment of this application.

In addition, it should be noted that, in an embodiment, as shown in FIG. 8, after the terminal device sends the measurement report of the first identity to the network device at the moment T1, the terminal device may restart the first timer. During timing of the first timer, the terminal device performs cell handover or RRC connection re-establishment. In this case, the terminal device needs to restart the first timer after the cell handover succeeds or the connection to the cell is successfully re-established. In addition, when the first timer expires, that is, at a moment T2', the terminal device sends the measurement report of the first identity to the network device. If the terminal device receives a measurement configuration sent by the network device again, the terminal device may send a measurement report to the network device based on the measurement configuration.

The measurement report provided in this embodiment of this application may further include a measurement result of a serving cell of the terminal device. The serving cell herein may be a serving cell for which a serving cell measurement object field (that is, a servingCellMO field) is configured. The following further describes the measurement report provided in this embodiment of this application.

1. The report configuration associated with the second identity may further include an indication for reporting a strongest neighboring cell of a serving cell of the terminal device. If at least one second identity in the second identities associated with the first identity is associated with the indication for reporting the strongest neighboring cell of the serving cell of the terminal device, the terminal device may perform measurement on the neighboring cell of the serving cell, to obtain a measurement result of each neighboring cell. The terminal device may send, based on the measurement result of each neighboring cell, a measurement report carrying the measurement result of the strongest neighboring cell to the network device.

2. The report configuration associated with the second identity may further include an indication for reporting a specified measurement quantity type. If at least one second identity in the second identities associated with the first identity is associated with the indication for reporting the specified measurement quantity type, the terminal device performs measurement on a specified measurement quantity type of the serving cell. The terminal device may send a measurement report carrying a measurement result of the specified measurement quantity type of the terminal device to the network device. The specified measurement quantity type may be an SINR, an RSRP, or an RSRQ.

3. The report configuration associated with the second identity may further include an indication for indicating a reference signal type. The reference signal type includes a synchronization/broadcast channel signal block (SSB) or a channel state information reference signal (CSI-RS). If a reference signal type associated with at least one second identity in the second identities associated with the first identity is an indication for indicating the SSB or the CSI-RS, the terminal device may perform measurement on the SSB or the CSI-RS of the serving cell. The terminal device may send a measurement report carrying a measurement result of the SSB or the CSI-RS of the serving cell to the network device.

4. The report configuration associated with the second identity may further include a first value. The first value indicates a maximum quantity of beams reported by the terminal device. If at least one second identity in the second identities associated with the first identity is associated with the first value, the terminal device may add, to a measurement report, a measurement result of a beam, of the serving cell, whose quantity does not exceed a second value. The second value herein may be determined based on the first value.

For example, if a plurality of second identities in the second identities associated with the first identity are associated with the first value, and the plurality of first values are different, the second value may be a maximum value in the plurality of first values, or may be a minimum value in the plurality of first values, or may be any value in the plurality of first values. If only one second identity in the second identities associated with the first identity is associated with the first value, the second value may be the same as the first value. If a plurality of second identities in the second identities associated with the first identity are associated with the first value, and the plurality of first values are the same, the second value may be the same as the plurality of first values.

In this embodiment of this application, the report configuration of the second identity may further include a second timer. If the terminal device fails to send the measurement report of the first identity to the network device, for example, fails to send the measurement report during timing of a timer T310 or fails to send the measurement report when the first period expires, and at least one second identity in the second identities associated with the first identity is associated with the second timer, the terminal device may start the second timer. When the second timer expires, an operation corresponding to the second timer is executed. If a plurality of second identities in the second identities associated with the first identity are associated with different second timers, the terminal device may determine a second timer with a highest priority based on priorities of the timers, and start the second timer with the highest priority.

In this embodiment of this application, if the terminal device enters a medium-speed or high-speed state, the terminal device may determine a scale factor. The scale factor may be preconfigured based on an empirical value. Alternatively, the scale factor may be indicated by the network device to the terminal device. For example, the terminal device may request the scale factor from the network device when determining to enter the medium-speed or high-speed state. The scale factor may be used to scale the first period. The medium-speed or high-speed state may mean that a quantity of cell handover times of the terminal device within a specific time exceeds a specified quantity of times.

For example, after entering the medium-speed or high-speed state, the terminal device determines that the scale factor is 0.5. The terminal device receives a measurement configuration sent by the network device, where the measurement configuration includes a first identity and a first period of the first identity. When performing measurement on the measurement object, the terminal device may also shorten a measurement time based on the scale factor. When 0.5 times of the first period arrives, the terminal device sends the measurement report of the first identity to the network device.

In addition, it should be noted that for some types of measurement, the measurement report can be sent to the network device in other methods instead of the communication method provided in this embodiment of this application. The following methods can also be used, for example, cell global identity (CGI) measurement, system frame number (SFN) and frame timing difference (SFTD) measurement, and SFN and subframe timing difference (SSTD) measurement. A measurement type that does not use the communication method provided in this embodiment of this application may be configured by the network device for the terminal device, or may be preset (for example, specified in a protocol).

The foregoing describes the communication method in embodiments of this application, and the following describes a communication apparatus in embodiments of this application. The method and the apparatus are based on a same technical idea. The method and the apparatus have similar principles for resolving problems. Therefore, for embodiments of the apparatus and the method, refer to each other, and details of repeated parts are not described again.

Figure 9:
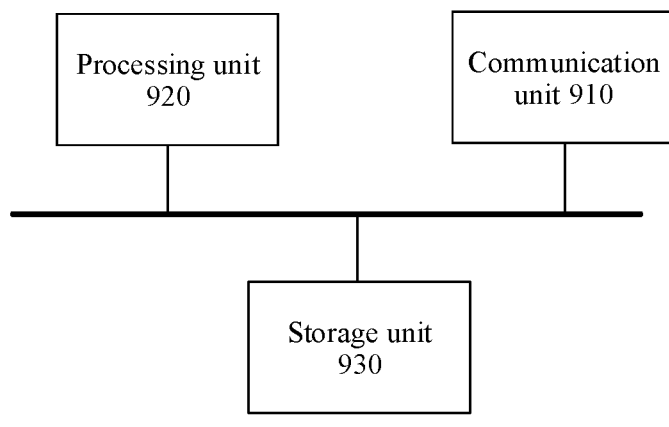
FIG. 9 is one of schematic diagrams of a communication apparatus according to an embodiment of this application.

Based on the same technical idea as the foregoing communication method, as shown in FIG. 9, a communication apparatus 900 is provided. The communication apparatus 900 can perform the operations performed by the terminal device in the foregoing method. To avoid repetition, details are not described herein again. The communication apparatus 900 includes a communication unit 910 and a processing unit 920, and optionally, further includes a storage unit 930. The processing unit 920 may be separately connected to the storage unit 930 and the communication unit 910, or the storage unit 930 may be connected to the communication unit 910.

The storage unit 930 is configured to store a computer program.

For example, the communication unit 910 is configured to receive a measurement configuration. For related descriptions of the measurement configuration, refer to the descriptions in the foregoing method embodiments. The processing unit 920 is configured to perform measurement on a measurement object to obtain a measurement result.

The communication unit 910 is further configured to send a measurement report when a first period expires. For related descriptions of the measurement report, refer to the descriptions in the foregoing method embodiments.

In a possible embodiment, the communication unit 910 is further configured to receive at least one second identity associated with a first identity. For related descriptions of the at least one second identity, refer to the descriptions in the foregoing method embodiments.

In a possible embodiment, the processing unit 920 is further configured to increase a quantity of reporting times of the at least one second identity by a specified value.

In a possible embodiment, the processing unit 920 is further configured to start a first timer. For related descriptions of the first timer, refer to the descriptions in the foregoing method embodiments. The communication unit 910 is specifically configured to: when the first timer times out, send the measurement report of the first identity. In a possible embodiment, the processing unit 920 is further configured to restart the first timer.

The communication apparatus may alternatively be a chip. The communication unit may be an input/output circuit or an interface of the chip. The processing unit may be a logic circuit. The logic circuit may process to-be-processed data based on the operations described in the foregoing method aspects, to obtain processed data. The to-be-processed data may be data received by an input circuit/interface, for example, the measurement configuration. The processed data may be data obtained based on the to-be-processed data, for example, the measurement report. The output circuit/interface is configured to output the processed data.

Figure 10:
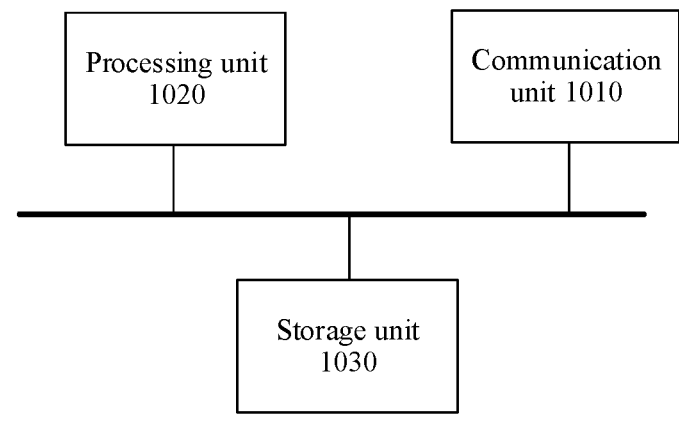
FIG. 10 is one of schematic diagrams of a communication apparatus according to an embodiment of this application.

Based on the same technical idea as the foregoing communication method, as shown in FIG. 10, a communication apparatus 1000 is provided. The communication apparatus 1000 can perform the operations performed by the network device in the foregoing method. To avoid repetition, details are not described herein again. The communication apparatus 1000 includes a communication unit 1010 and a processing unit 1020, and optionally, further includes a storage unit 1030. The processing unit 1020 may be separately connected to the storage unit 1030 and the communication unit 1010, or the storage unit 1030 may be connected to the communication unit 1010.

The storage unit 1030 is configured to store a computer program.

For example, the communication unit 1010 is configured to receive a measurement report. For related descriptions of the measurement report, refer to the descriptions in the method embodiments. The processing unit 1020 is configured to process the measurement report.

In a possible embodiment, the communication unit 1010 is further configured to send a measurement configuration. For related descriptions of the measurement configuration, refer to the descriptions in the method embodiments.

In a possible embodiment, the communication unit 1010 is further configured to send at least one second identity associated with a first identity. For related descriptions of the at least one second identity, refer to the descriptions in the foregoing method embodiments.

When the communication apparatus is a chip, the communication unit may be an input/output circuit or an interface of the chip. The processing unit may be a logic circuit. The logic circuit may process to-be-processed data based on the operations described in the foregoing method aspects, to obtain processed data. The to-be-processed data may be data received by an input circuit/interface, for example, the received measurement report. The processed data may be data obtained based on the to-be-processed data or data that needs to be sent in a downlink manner, for example, an RRC decision or other downlink data. The output circuit/interface is configured to output data that needs to be sent in a downlink direction.

An embodiment of this application further provides a communication apparatus. The communication apparatus may be a terminal device, or may be a circuit. The communication apparatus may be configured to perform an action performed by the terminal device in the foregoing method embodiment.

Figure 11:
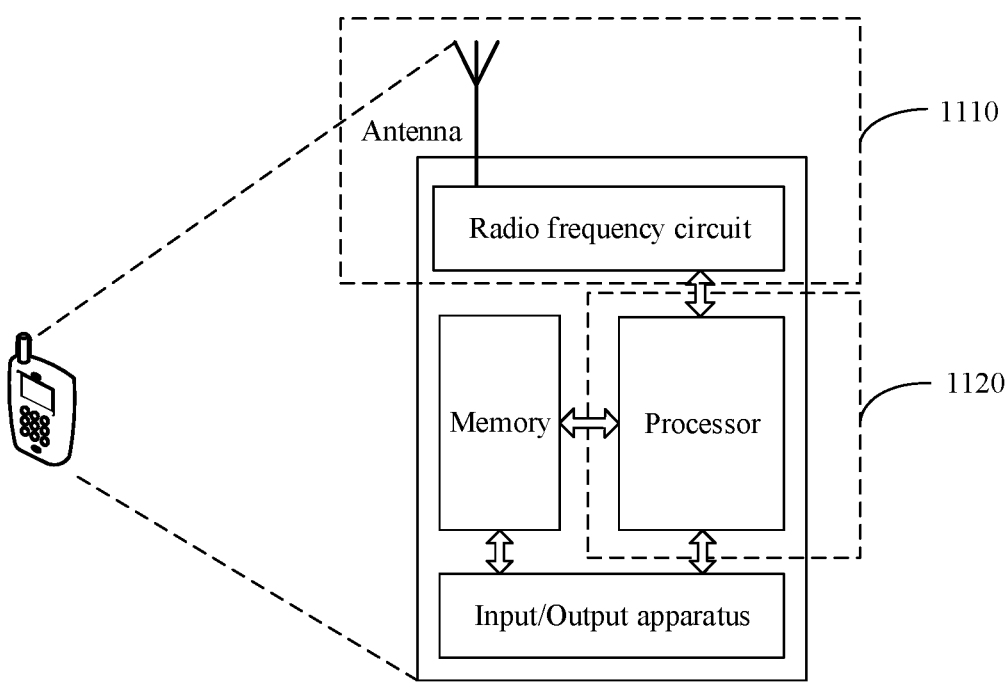
FIG. 11 is one of schematic block diagrams of a communication apparatus according to an embodiment of this application.

When the communication apparatus is the terminal device, FIG. 11 is a simplified schematic diagram of a structure of the terminal device. For ease of understanding and ease of illustration, in FIG. 11, an example in which the terminal device is a mobile phone is used. As shown in FIG. 11, the terminal device includes a processor, a memory, a radio frequency circuit, an antenna, and an input/output apparatus. The processor is mainly configured to: process a communication protocol and communication data, control the terminal device, execute a software program, process data of the software program, and the like. The memory is mainly configured to store the software program and data. The radio frequency circuit is mainly configured to perform conversion between a baseband signal and a radio frequency signal, and process the radio frequency signal. The antenna is mainly configured to receive and send a radio frequency signal in a form of an electromagnetic wave. The input/output apparatus, such as a touchscreen, a display, or a keyboard, is mainly configured to receive data input by a user and output data to the user. It should be noted that some types of terminal devices may have no input/output apparatus.

When needing to send data, after performing baseband processing on the to-be-sent data, the processor outputs a baseband signal to the radio frequency circuit; and the radio frequency circuit performs radio frequency processing on the baseband signal and then sends the radio frequency signal to the outside in a form of an electromagnetic wave through the antenna. When data is sent to the terminal device, the radio frequency circuit receives the radio frequency signal through the antenna, converts the radio frequency signal into a baseband signal, and outputs the baseband signal to the processor. The processor converts the baseband signal into data, and processes the data. For ease of description, FIG. 11 shows only one memory and one processor. In an actual terminal device product, there may be one or more processors and one or more memories. The memory may also be referred to as a storage medium, a storage device, or the like. The memory may be disposed independent of the processor, or may be integrated with the processor. This is not limited in embodiments of this application.

In this embodiment of this application, an antenna and a radio frequency circuit that have sending and receiving functions may be considered as a communication unit of the terminal device, and a processor that has a processing function may be considered as a processing unit of the terminal device. As shown in FIG. 11, the terminal device includes a communication unit 1110 and a processing unit 1120. The communication unit may also be referred to as a transceiver, a transceiver apparatus, or the like. The processing unit may also be referred to as a processor, a processing board, a processing module, a processing apparatus, or the like. Optionally, a component that is in the communication unit 1110 and that is configured to implement the receiving function may be considered as a receiving unit, and a component that is in the communication unit 1110 and that is configured to implement the sending function may be considered as a sending unit. That is, the communication unit 1110 includes the receiving unit and the sending unit. The communication unit sometimes may also be referred to as a transceiver machine, a transceiver, a transceiver circuit, or the like. The receiving unit sometimes may also be referred to as a receiver machine, a receiver, a receive circuit, or the like. The sending unit sometimes may also be referred to as a transmitter machine, a transmitter, a transmit circuit, or the like.

It should be understood that the communication unit 1110 is configured to perform a sending operation and a receiving operation on a terminal device side in the foregoing method embodiments, and the processing unit 1120 is configured to perform an operation other than the sending operation and the receiving operation of the terminal device in the foregoing method embodiments.

For example, in an embodiment, the communication unit 1110 is configured to perform the sending operation on the terminal device side in operation 203 in FIG. 2, and/or the communication unit 1110 is further configured to perform other receiving and sending operations on the terminal device side in the embodiments of this application. The processing unit 1120 is configured to perform operation 202 in FIG. 2, and/or the processing unit 1120 is further configured to perform another processing operation on the terminal device side in the embodiments of this application.

When the communication apparatus is a chip apparatus or circuit, the apparatus may include a communication unit and a processing unit. The communication unit may be an input/output circuit and/or a communication interface. The processing unit is an integrated processor, a microprocessor, or an integrated circuit.

Figure 12:
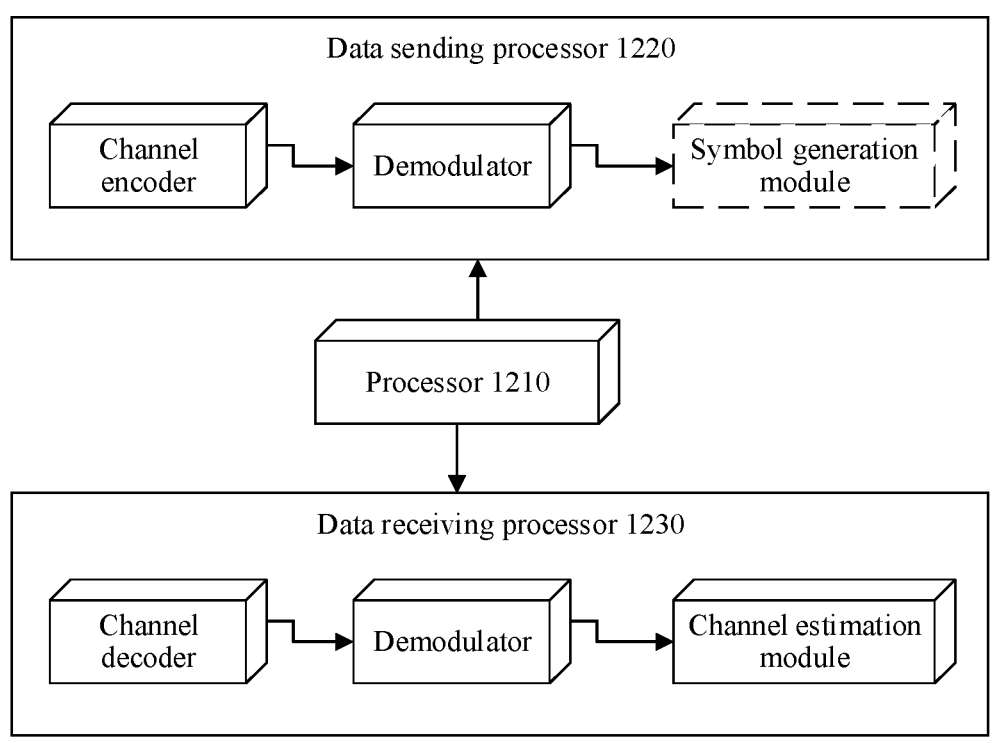
FIG. 12 is one of schematic block diagrams of a communication apparatus according to an embodiment of this application.

When the communication apparatus in this embodiment is the terminal device, refer to a device shown in FIG. 12. In an example, the device may implement a function similar to that of the processing unit 1120 in FIG. 11. In FIG. 12, the device includes a processor 1210, a data sending processor 1220, and a data receiving processor 1230. The processing unit 1120 in the foregoing embodiment may be the processor 1210 in FIG. 12, and implements a corresponding function. The communication unit 1110 in the foregoing embodiment may be the data sending processor 1220 and/or the data receiving processor 1230 in FIG. 12. Although FIG. 12 shows a channel encoder and a channel decoder, it may be understood that the modules are merely examples, and do not constitute a limitation on this embodiment.

Figure 13:
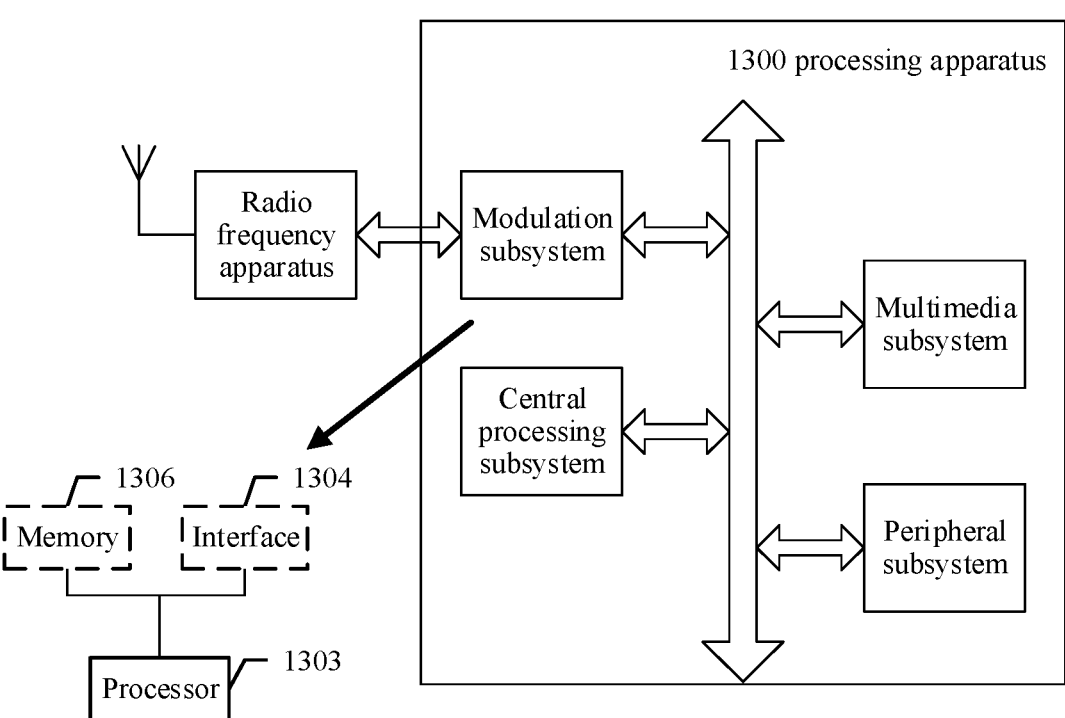
FIG. 13 is one of schematic block diagrams of a communication apparatus according to an embodiment of this application.

FIG. 13 shows another form of this embodiment. A processing apparatus 1300 includes modules such as a modulation subsystem, a central processing subsystem, and a peripheral subsystem. The communication apparatus in this embodiment may be used as the modulation subsystem. Specifically, the modulation subsystem may include a processor 1303 and an interface 1304. The processor 1303 implements the function of the processing unit 1120, and the interface 1304 implements the function of the communication unit 1110. In another variation, the modulation subsystem includes a memory 1306, a processor 1303, and a program that is stored in the memory 1306 and that can be run on the processor. When executing the program, the processor 1303 implements the method on the terminal device side in the foregoing method embodiments. It should be noted that the memory 1306 may be a non-volatile memory or a volatile memory. The memory 1306 may be located in the modulation subsystem, or may be located in the processing apparatus 1300, provided that the memory 1306 can be connected to the processor 1303.

In another form of this embodiment, a computer-readable storage medium is provided. The computer-readable storage medium stores instructions. When the instructions are executed, the method on the terminal device side in the foregoing method embodiments is performed.

In another form of this embodiment, a computer program product including instructions is provided. When the instructions are executed, the method on the terminal device side in the foregoing method embodiments is performed.

Figure 14:
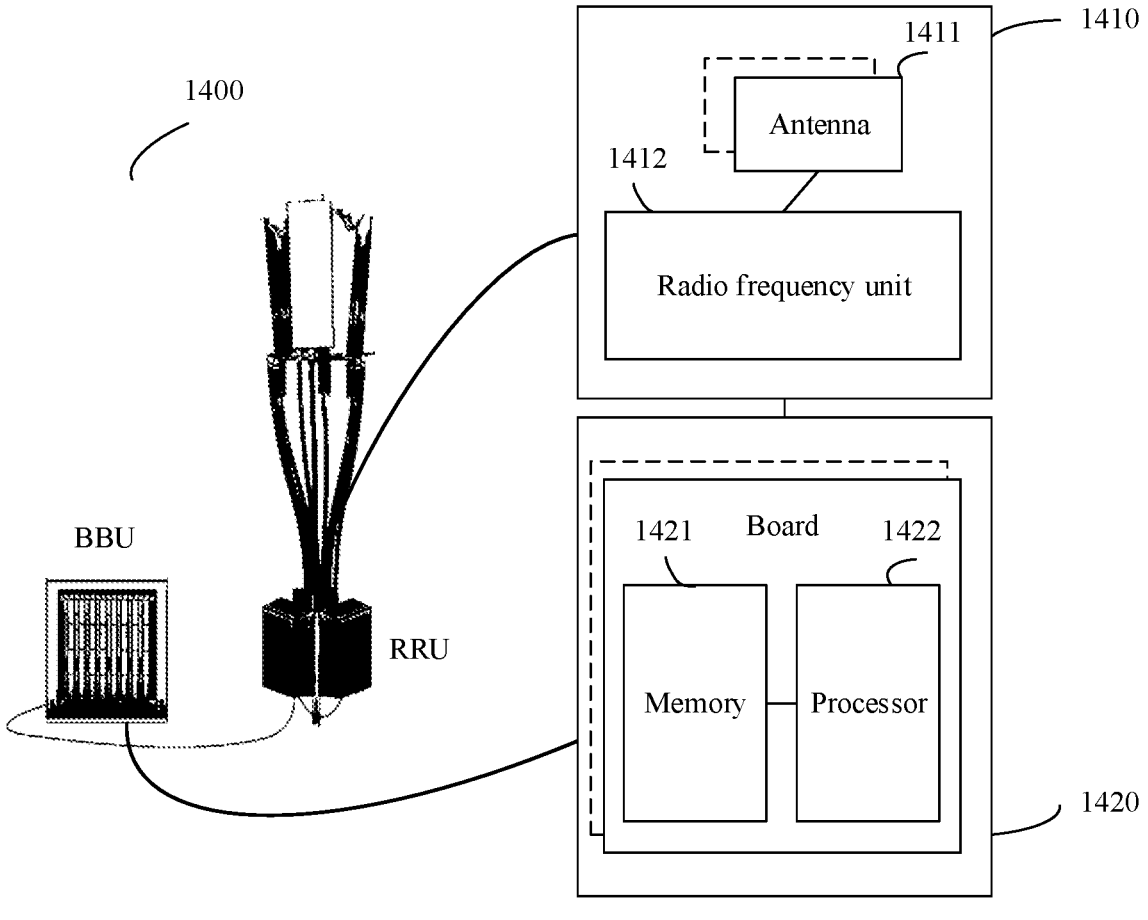
FIG. 14 is one of schematic block diagrams of a communication apparatus according to an embodiment of this application.

When the apparatus in this embodiment is a network device, the network device may be shown in FIG. 14. The apparatus 1400 includes one or more radio frequency units, for example, a remote radio unit (RRU) 1410 and one or more baseband units (BBU) (which may also be referred to as a digital unit (DU)) 1420. The RRU 1410 may be referred to as a transceiver module, and corresponds to the communication unit 1010 in FIG. 10. Optionally, the communication unit may also be referred to as a transceiver machine, a transceiver circuit, a transceiver, or the like, and may include at least one antenna 1411 and a radio frequency unit 1412. The RRU 1410 is mainly configured to receive and send a radio frequency signal, and perform conversion between the radio frequency signal and a baseband signal, for example, send indication information to a terminal device. The BBU 1410 is mainly configured to perform baseband processing, control the base station, and the like. The RRU 1410 and the BBU 1420 may be physically disposed together, or may be physically disposed separately, to be specific, may be on a distributed base station.

The BBU 1420 is a control center of the base station, and may also be referred to as a processing module. The BBU 1420 may correspond to the processing unit 1020 in FIG. 10, and is mainly configured to implement a baseband processing function such as channel coding, multiplexing, modulation, or spreading. For example, the the the processing module (such as a BBU) may be configured to control the base station to perform an operation procedure related to the network device in the foregoing method embodiments, for example, process the foregoing measurement report.

In an example, the BBU 1420 may include one or more boards, and a plurality of boards may jointly support a radio access network (such as an LTE network) of a single access standard, or may separately support radio access networks (such as an LTE network, a 5G network, or another network) of different access standards. The BBU 1420 further includes a memory 1421 and a processor 1422. The memory 1421 is configured to store necessary instructions and data. The processor 1422 is configured to control the base station to perform a necessary action, for example, configured to control the base station to perform an operation procedure related to the network device in the foregoing method embodiment. The memory 1421 and the processor 1422 may serve the one or more boards. In other words, a memory and a processor may be disposed on each board. Alternatively, a plurality of boards may share a same memory and a same processor. In addition, a necessary circuit may further be disposed on each board.

It should be understood that the processor mentioned in the embodiments of the present invention may be a central processing unit (CPU), or may be another general purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It may be understood that the memory mentioned in embodiments of the present invention may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general purpose processor, a DSP, an ASIC, an FPGA or another programmable logic device, a discrete gate, a transistor logic device, or a discrete hardware component, the memory (a storage module) is integrated into the processor.

It should be noted that the memory described in this specification aims to include but is not limited to these memories and any memory of another appropriate type.

It should be understood that sequence numbers of the foregoing processes do not mean execution sequences in various embodiments of this application. The execution sequences of the processes should be determined according to functions and internal logic of the processes, and should not be construed as any limitation on the embodiment processes of embodiments of the present invention.

A person of ordinary skill in the art may be aware that, in combination with the examples described in embodiments disclosed in this specification, units and algorithm operations may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the embodiment goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual embodiment. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the operations of the methods described in the embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific embodiments of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, wherein the method comprises:
receiving a measurement configuration comprising a first identity, a first period of the first identity, and a second identity list associated with the first identity; and
sending a measurement report of the first identity when the first period expires, wherein the measurement report comprises the first identity and a measurement result of the first identity, and the measurement result of the first identity comprises a measurement result of at least one second identity in the second identity list.

2. The method according to claim 1, wherein the measurement result of the at least one second identity is obtained through measurement within the first period.

3. The method according to claim 1, wherein the at least one second identity is associated with a total quantity of reporting times, and the method further comprises:
increasing a quantity of reporting times of the at least one second identity by a specified value; and
wherein the measurement result of the first identity comprising the measurement result of the at least one second identity comprises:
the measurement result of the first identity comprises a measurement result of a second identity, in the second identity list, whose quantity of reporting times is less than or equal to the total quantity of reporting times.

4. The method according to claim 1, wherein the measurement report further comprises a measurement result of a serving cell of a terminal device.

5. The method according to claim 1, wherein the method further comprises:
starting a first timer, wherein a duration of the first timer is the first period; and
the sending the measurement report when the first period expires comprises:
when the first timer times out, sending the measurement report, and restarting the first timer.

6. The method according to claim 1, wherein:

in response to one or more second identity in the at least one second identity being associated with an indication for reporting a strongest neighboring cell of a serving cell of a terminal device, the measurement report further comprises a measurement result of the strongest neighboring cell of the serving cell of the terminal device; or in response to one or more second identity in the at least one second identity being associated with an indication for reporting a specified measurement quantity type, the measurement report further comprises a measurement result of the specified measurement quantity type of a serving cell of a terminal device.

7. A communication apparatus, comprising:

a memory; and at least one processor coupled with the memory configured to cause the communication apparatus to:

receive a measurement configuration comprising a first identity, a first period of the first identity, and a second identity list associated with the first identity; and send a measurement report of the first identity when the first period expires, the measurement report comprises the first identity and a measurement result of the first identity, and the measurement result of the first identity comprises a measurement result of at least one second identity in the second identity list.

8. The apparatus according to claim 7, wherein the measurement result of the at least one second identity is obtained through measurement within the first period.

9. The apparatus according to claim 7, wherein the at least one second identity is associated with a total quantity of reporting times, and the at least one processor is further configured to cause the communication apparatus to increase a quantity of reporting times of the at least one second identity by a specified value; and wherein the measurement result of the first identity comprising the measurement result of the at least one second identity comprises:

the measurement result of the first identity comprises a measurement result of a second identity, in the second identity list, whose quantity of reporting times is less than or equal to the total quantity of reporting times.

10. The apparatus according to claim 7, wherein the measurement report further comprises a measurement result of a serving cell of the communication apparatus.

11. The apparatus according to claim 7, wherein the at least one processor is further configured to cause the communication apparatus to:

start a first timer, wherein a duration of the first timer is the first period; and when the first timer times out, send the measurement report of the first identity, and restart the first timer.

12. The apparatus according to claim 7, wherein:

in response to one or more second identity in the at least one second identity being associated with an indication for reporting a strongest neighboring cell of a serving cell of the communication apparatus, the measurement report further comprises a measurement result of the strongest neighboring cell of the serving cell of the communication apparatus; or in response to one or more second identity in the at least one second identity being associated with an indication for reporting a specified measurement quantity type, the measurement report further comprises a measurement result of the specified measurement quantity type of a serving cell of the communication apparatus.

13. The apparatus according to claim 7, wherein in response to one or more second identity in the at least one second identity being associated with a first value, and the first value indicates a maximum quantity of beams reported by the communication apparatus, and the measurement report further comprises a measurement result of a beam, of the serving cell, whose quantity does not exceed a second value and the second value is determined based on the first value.

14. The apparatus according to claim 13, wherein the second value is a maximum value in a plurality of first values; or the second value is a minimum value in the plurality of first values; or in response to only one second identity in the at least one second identity being associated with the first value, the second value is the same as the first value.

15. A communication apparatus, comprising:

a memory; and at least one processor coupled with the memory configured to cause the communication apparatus to:

send a measurement configuration comprising a first identity, a first period of the first identity, and a second identity list associated with the first identity;

receive a measurement report of the first identity, wherein the measurement report comprises the first identity and a measurement result of the first identity, and the measurement result of the first identity comprises a measurement result of at least one second identity in the second identity list; and process the received measurement report.

16. The apparatus according to claim 15, wherein the measurement result of the at least one second identity is obtained through measurement within the first period.

17. The method according to claim 1, wherein:

in response to one or more second identity in the at least one second identity being associated with a first value, and the first value indicating a maximum quantity of beams reported by a terminal device, the measurement report further comprises a measurement result of a beam, of the serving cell, whose quantity does not exceed a second value and the second value is determined based on the first value.

18. The method according to claim 17, wherein the second value is a maximum value in a plurality of first values; or the second value is a minimum value in the plurality of first values; or in response to only one second identity in the at least one second identity being associated with the first value, the second value is the same as the first value.

19. The method according to claim 1, wherein the method further comprises:

performing measurement based on the at least one second identity to obtain the measurement result.

20. The apparatus according to claim 7, wherein the at least one processor is further configured to cause the communication apparatus to:

perform measurement based on the at least one second identity to obtain the measurement result.

* * * * *